US006201499B1

(12) United States Patent
Hawkes et al.

(10) Patent No.: US 6,201,499 B1
(45) Date of Patent: Mar. 13, 2001

(54) TIME DIFFERENCE OF ARRIVAL MEASUREMENT SYSTEM

(75) Inventors: Kelly D. Hawkes, Los Altos; Jeffrey L. Koehler, San Jose, both of CA (US)

(73) Assignee: Consair Communications, Palo Alto, CA (US)

( * ) Notice: Subject to any disclaimer, the term of this patent is extended or adjusted under 35 U.S.C. 154(b) by 0 days.

(21) Appl. No.: 09/017,864

(22) Filed: Feb. 3, 1998

(51) Int. Cl.$^7$ ....................................................... G01S 1/24
(52) U.S. Cl. ............................................ 342/387; 455/456
(58) Field of Search ................................... 342/387, 457, 342/465, 463, 442; 455/456

(56) References Cited

U.S. PATENT DOCUMENTS

| | | |
|---|---|---|
| 3,680,121 | 7/1972 | Anderson et al. . |
| 4,297,701 | 10/1981 | Henriques . |
| 4,433,335 | 2/1984 | Wind . |
| 4,596,988 | 6/1986 | Wanka . |
| 4,604,717 | 8/1986 | Kaplan . |
| 4,636,795 | 1/1987 | Dano . |
| 4,638,321 | 1/1987 | Drogin . |
| 4,639,733 | 1/1987 | King et al. . |
| 4,651,156 | 3/1987 | Martinez . |
| 4,651,157 | 3/1987 | Gray et al. . |
| 4,728,959 | 3/1988 | Maloney et al. . |
| 4,736,460 | 4/1988 | Rilling . |
| 4,740,792 | 4/1988 | Sagey et al. . |
| 4,742,357 | 5/1988 | Rackley . |
| 4,752,969 | 6/1988 | Rilling . |
| 4,797,679 | 1/1989 | Cusdin et al. . |
| 4,797,950 | 1/1989 | Rilling . |
| 4,870,422 | 9/1989 | Counselman, III . |
| 4,888,593 | 12/1989 | Friedman et al. . |
| 4,891,650 | 1/1990 | Sheffer . |

(List continued on next page.)

FOREIGN PATENT DOCUMENTS

2215932 * 9/1989 (GB) .

OTHER PUBLICATIONS

Rappaport et al, "Position Location Using Wireless Communications on Highways of the Future," IEEE Comm. Magazine, Oct. 1996.*

Smith, Jr, "Passive Location of Mobile Cellular Terminals" 25$^{th}$ Annual 1991 IEEE International Carnahan Conf. on Security Tech. pp. 221–225, Oct. 1991.*

Kuykendall et al., "Cellular/PCS Systems Get In SYNC With GPS," *Wireless Systems Design*, 2 pgs., Feb. 1998.

Zablotney et al., "An Accurate Search and Rescue Location System," Proceedings of the 47th Annual meeting on Navigation and Exploration, 459–467, Jun. 1991.

Treichler et al., "New Processing Techniques Based on the Constant Modulus Adaptive Algorithm," *IEEE Transactions on Acoustics, Speech, and Signal Processing*, vol. 33, No. 2, 420–431, Apr. 1985.

(List continued on next page.)

*Primary Examiner*—Gregory C. Issing
(74) *Attorney, Agent, or Firm*—Fish & Richardson P.C.

(57) ABSTRACT

A method and apparatus for measuring the time difference of arrival between two received signals, each received signal being a time delayed version of a transmitted signal as intercepted at two different sensors where the transmitted signal is generated by a radio frequency transmitter. The apparatus includes a sensor having a receiver which receives a received signal and generates a receiver output signal, a decoder which decodes an encoded signal transferred from another sensor to generate a reconstructed signal representative of the transmitted signal received at the other sensor and a correlator for correlating the reconstructed signal and the receiver output signal to determine a time difference of arrival of the receipt of the transmitted signal at the respective sensors.

47 Claims, 9 Drawing Sheets

U.S. PATENT DOCUMENTS

| | | |
|---|---|---|
| 4,975,710 | 12/1990 | Baghdady . |
| 5,008,679 | 4/1991 | Effland et al. . |
| 5,126,748 | 6/1992 | Ames et al. . |
| 5,153,902 | 10/1992 | Buhl et al. . |
| 5,166,694 | 11/1992 | Russell et al. . |
| 5,208,756 | 5/1993 | Song . |
| 5,293,642 | 3/1994 | Lo . |
| 5,317,323 | 5/1994 | Kennedy et al. . |
| 5,327,144 | 7/1994 | Stilp et al. . |
| 5,365,516 | 11/1994 | Jandrell . |
| 5,388,147 | 2/1995 | Grimes . |
| 5,390,339 | 2/1995 | Bruckert et al. . |
| 5,398,190 | 3/1995 | Wortham . |
| 5,404,376 | 4/1995 | Dent . |
| 5,428,546 | 6/1995 | Shah et al. . |
| 5,469,409 | 11/1995 | Anderson et al. . |
| 5,479,482 | 12/1995 | Grimes . |
| 5,485,163 | 1/1996 | Singer et al. . |
| 5,506,864 | 4/1996 | Schilling . |
| 5,512,908 | 4/1996 | Herrick . |
| 5,515,419 | 5/1996 | Sheffer . |
| 5,519,621 | 5/1996 | Wortham . |
| 5,519,760 | 5/1996 | Borkowski et al. . |
| 5,534,876 | 7/1996 | Erickson et al. . |
| 5,548,816 | 8/1996 | De Vaney . |
| 5,555,286 | 9/1996 | Tendler . |
| 5,570,412 | 10/1996 | LeBlanc . |
| 5,583,517 | 12/1996 | Yokev et al. . |
| 5,592,180 | 1/1997 | Yokev et al. . |
| 5,600,706 | 2/1997 | Dunn et al. . |
| 5,608,410 * | 3/1997 | Stilp ................................. 342/387 |
| 5,890,068 * | 3/1999 | Fattoucae et al. .................. 455/456 |

OTHER PUBLICATIONS

Treichler et al., "A New Approach to Multipath Correction of Constant Modulus Signals," *IEEE Transactions on Acoustics, Speech, and Signal Processing*, vol. 31, No. 2, 459–472, Apr. 1983.

Ohgane et al., "An Implementation of a CMA Adaptive Array for High Speed GMSK Transmission in Mobile Communications," *IEEE Transactions on Vehicular Technology*, vol. 42, No. 3, 282–288, Aug. 1993.

Widrow et al.,"The Complex LMS Algorithm," Proceedings of the IEEE, 719–720, Apr. 1975.

R.O. Schmidt, "Multiple Emitter Location and Signal Parameter Estimation," *IEEE Transaction on Antennas and Propagation*, vol. 34, NO. 3, 276–280.

* cited by examiner

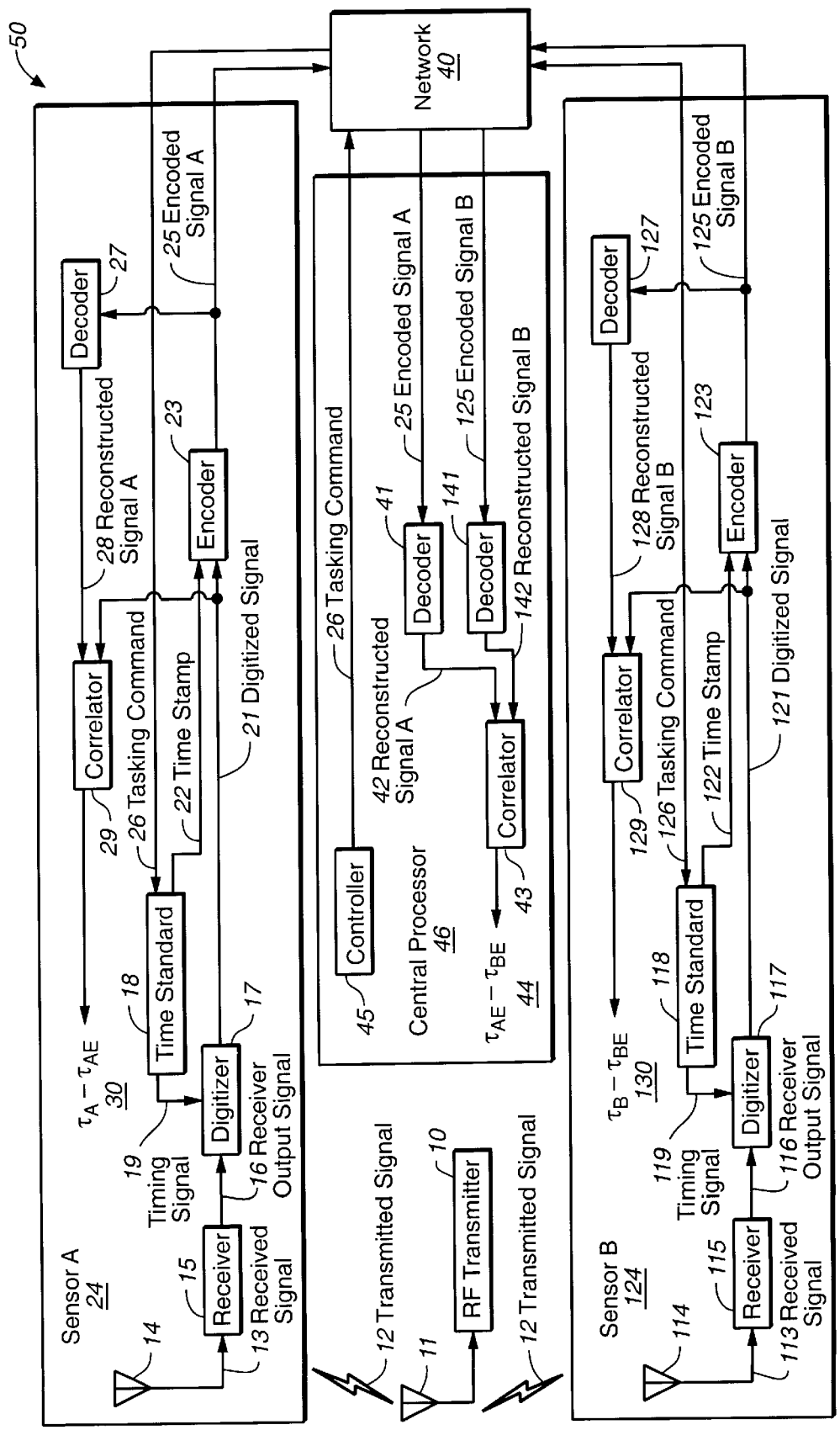
FIG._1

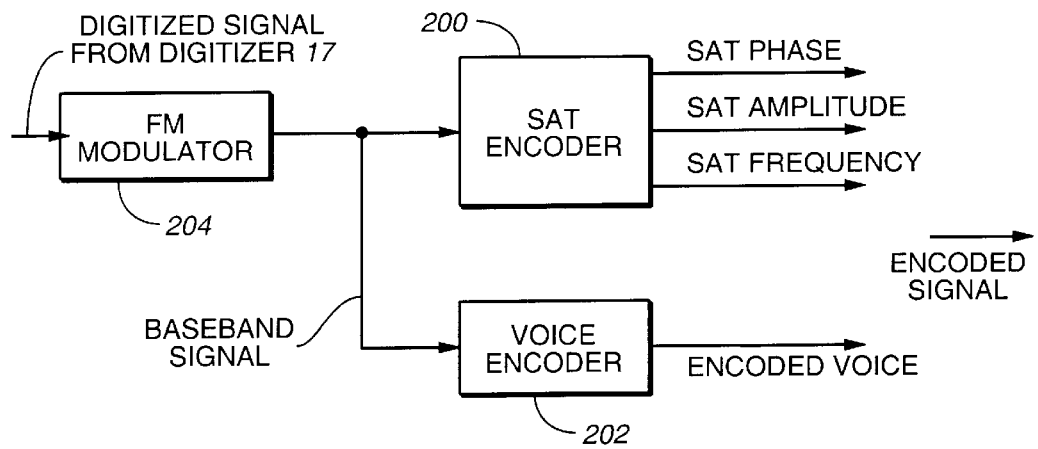
FIG._2
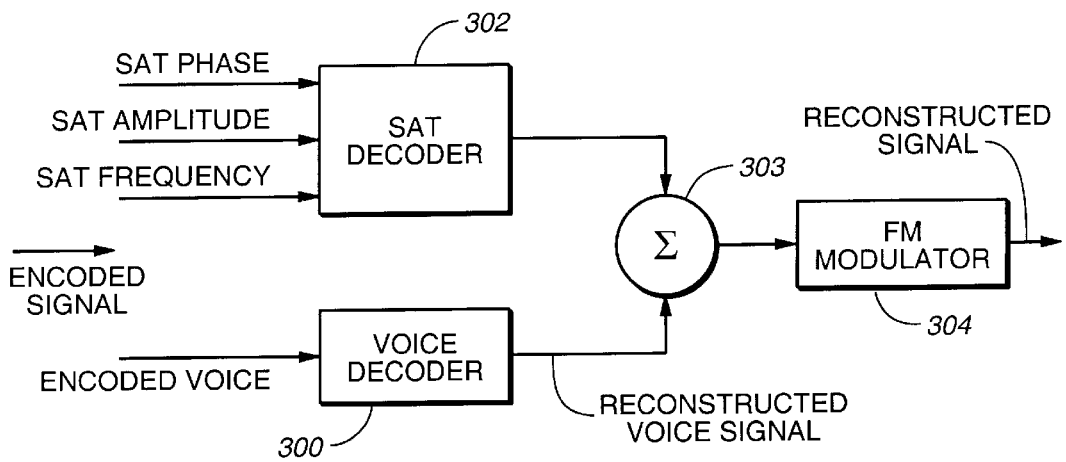
FIG._5

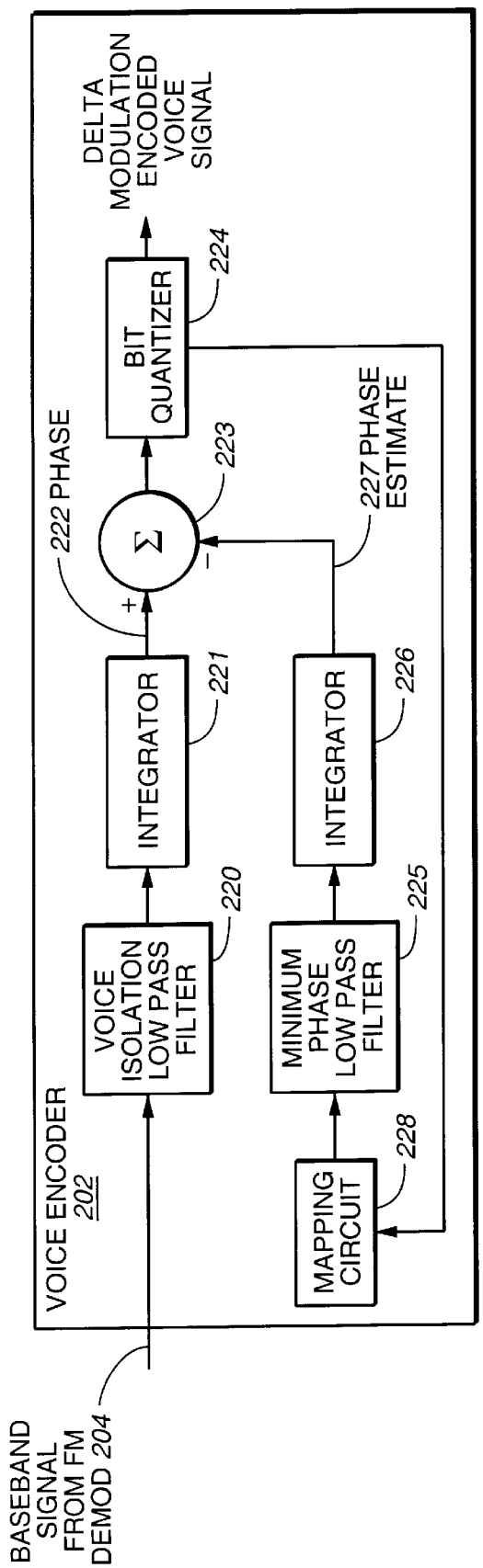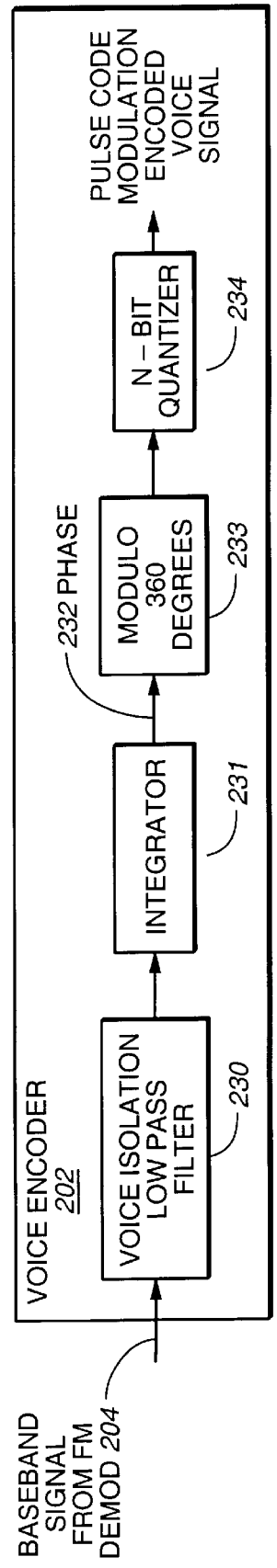

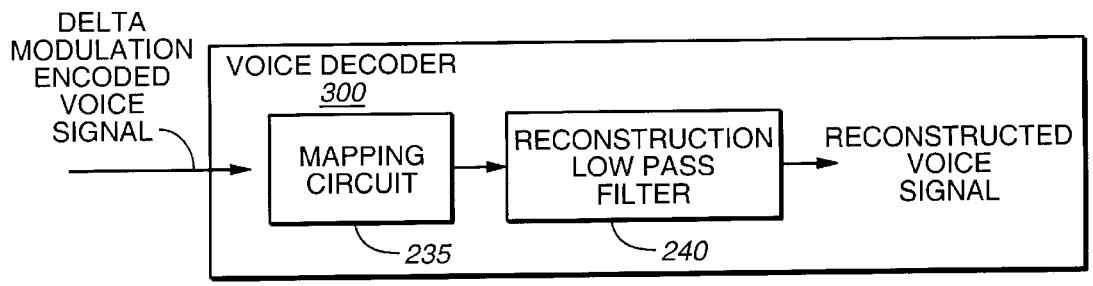
FIG._6
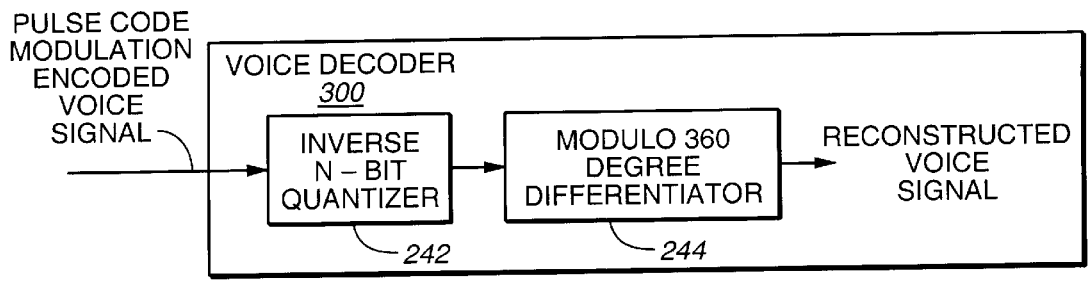
FIG._7
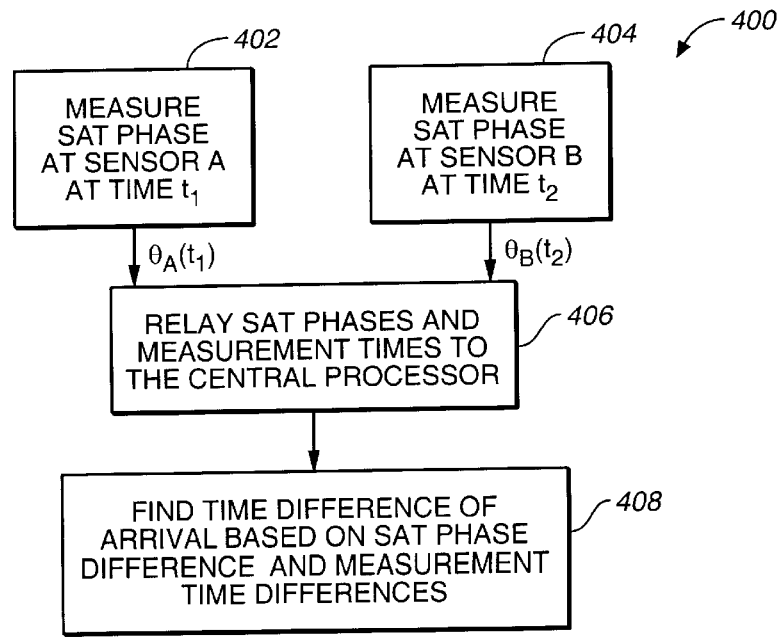
FIG._8

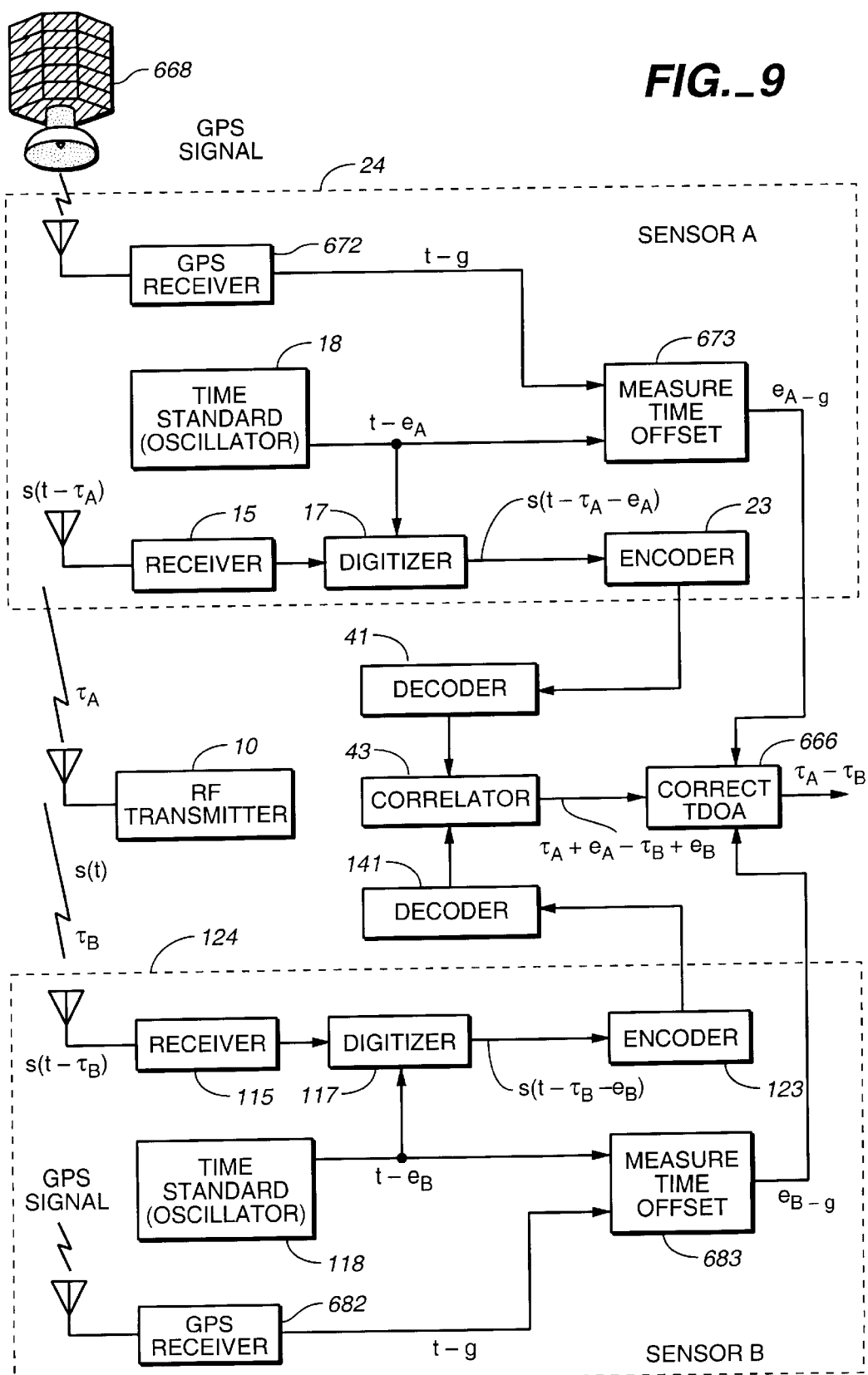
FIG._9

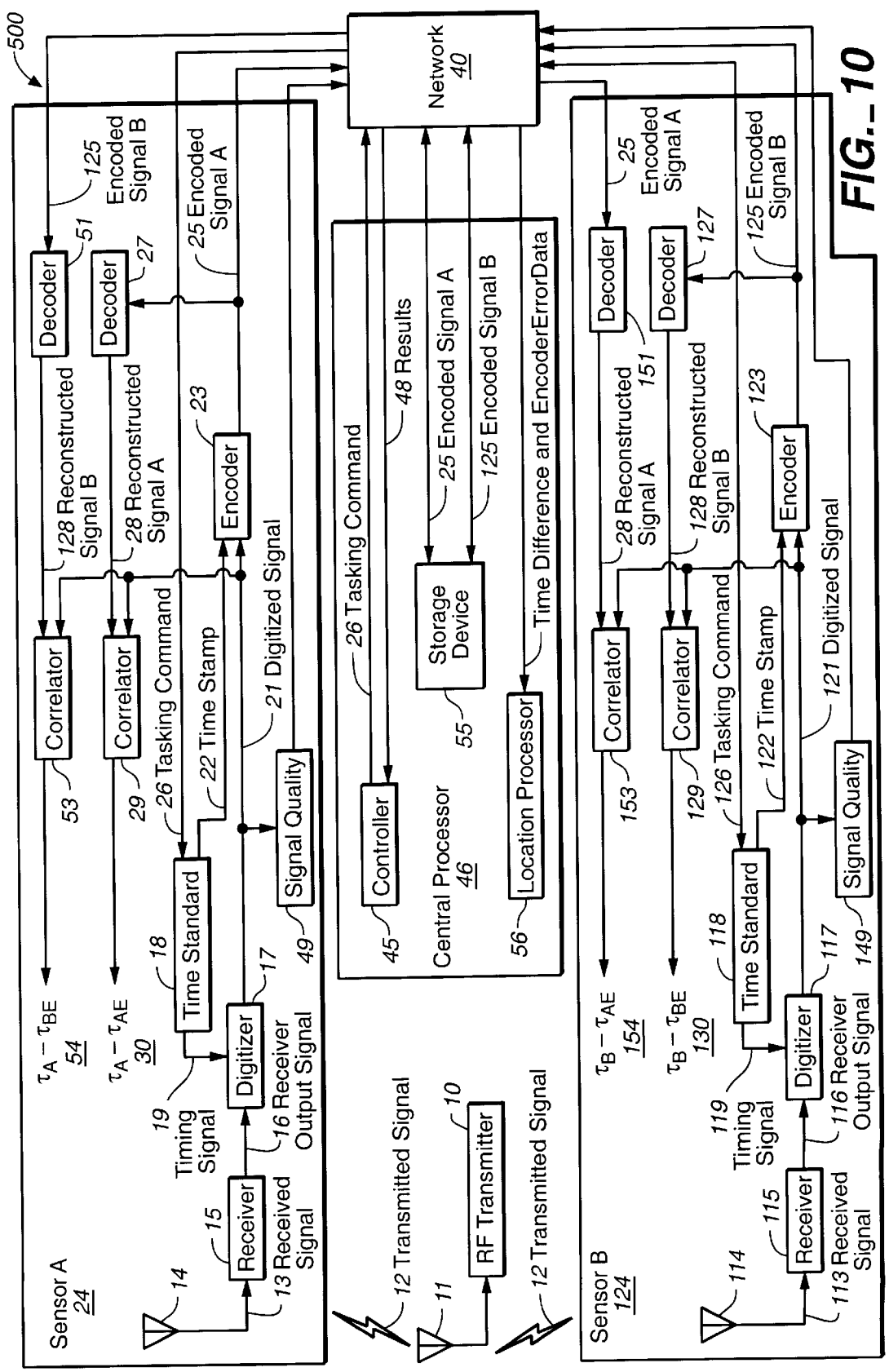

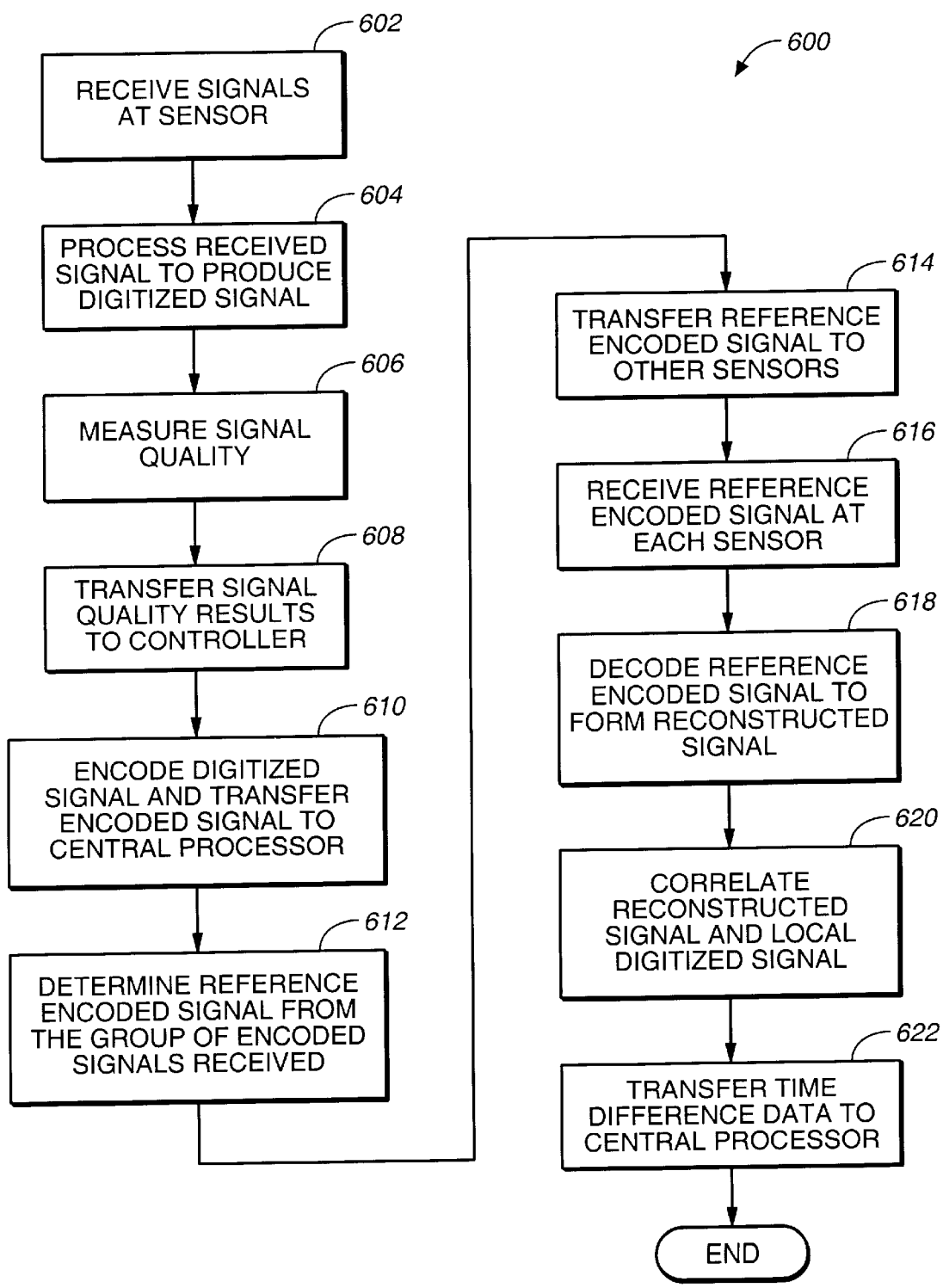
FIG._11

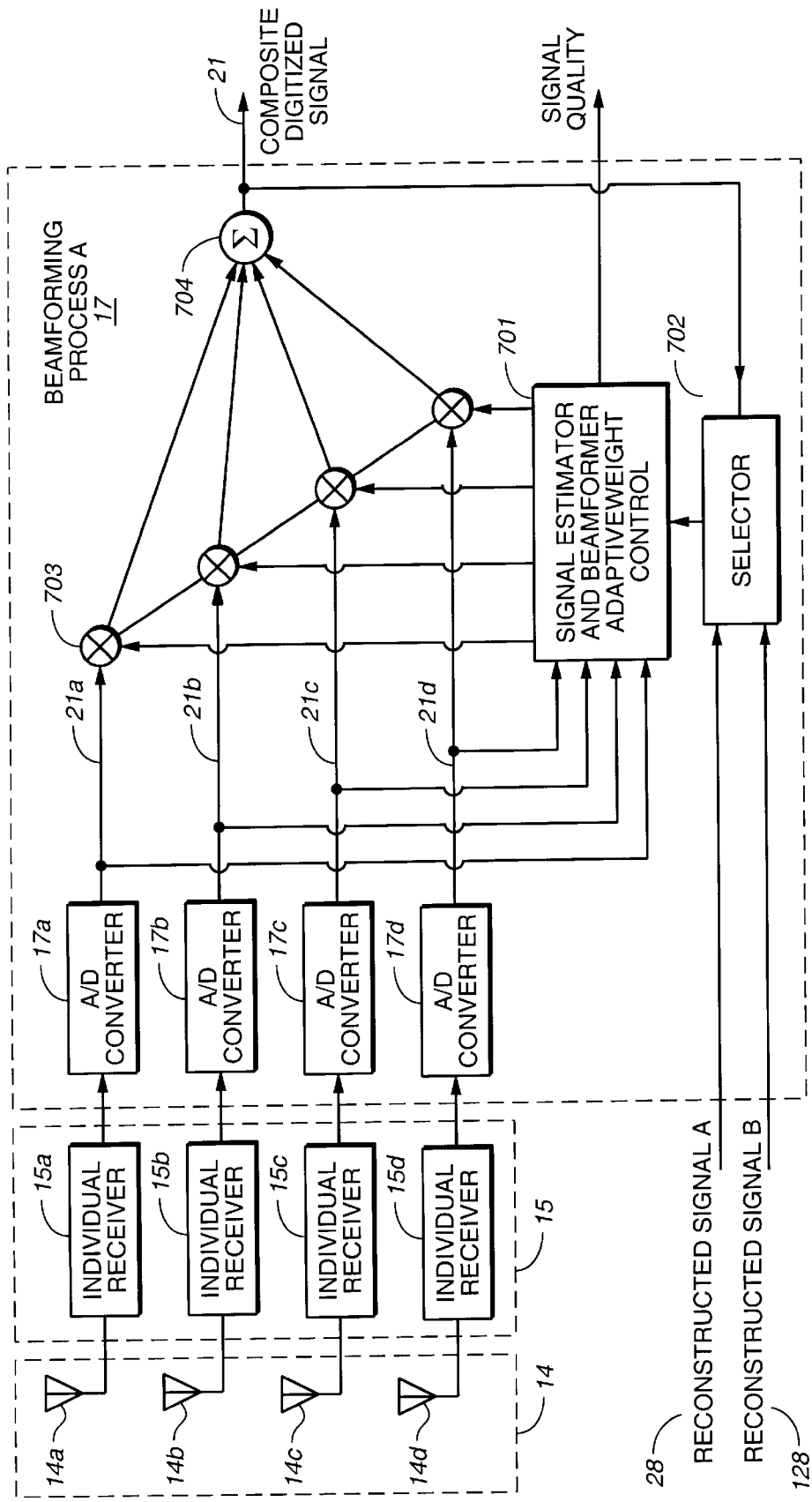
FIG._12

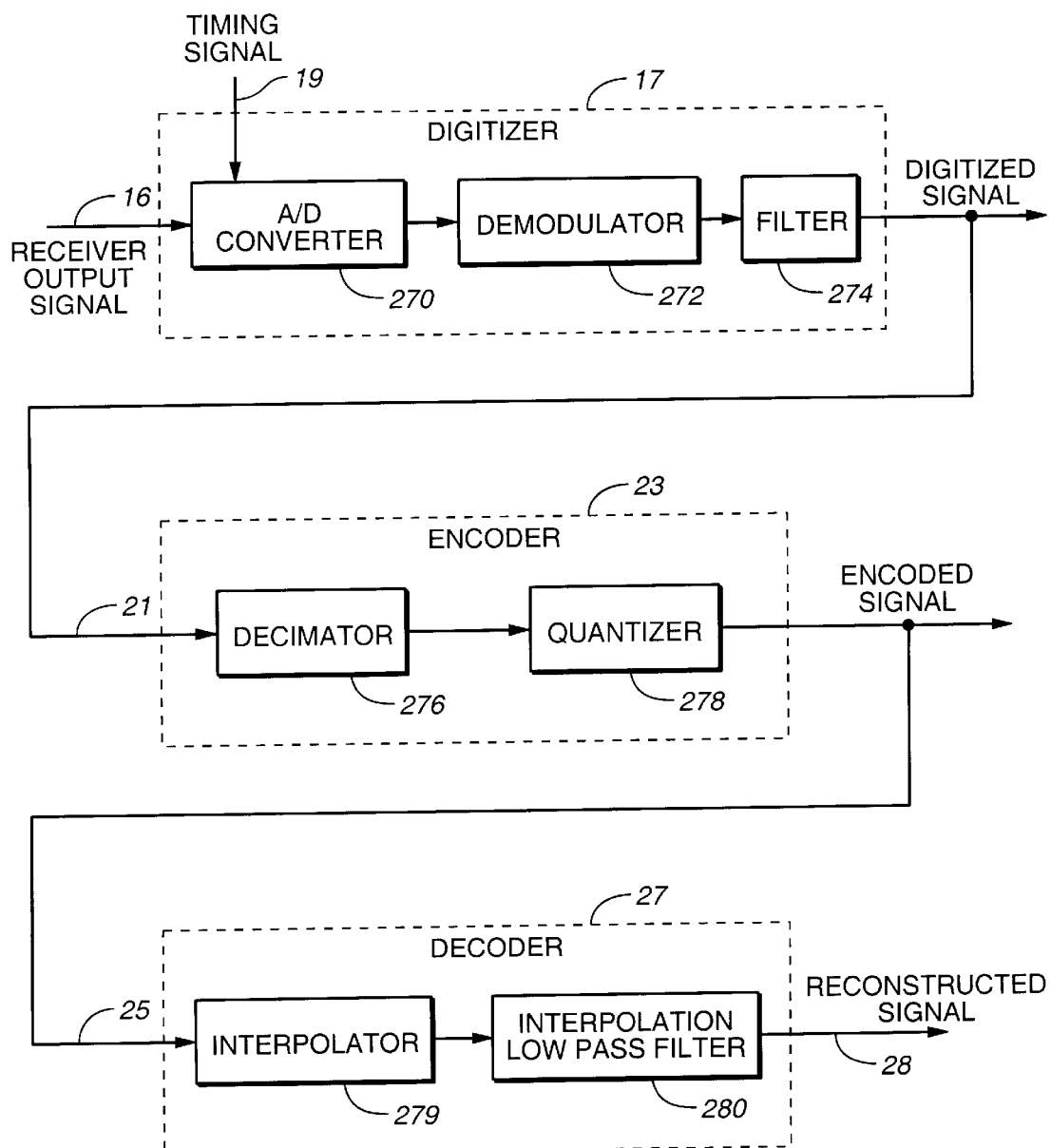
FIG._13

TIME DIFFERENCE OF ARRIVAL MEASUREMENT SYSTEM

BACKGROUND OF THE INVENTION

The present invention relates generally to communication systems and more particularly to methods and apparatus for measuring the time difference of arrival for signals received at two or more receiving stations.

BACKGROUND

In conventional cellular telephone systems, a network of overlapping cells (base stations) provides a seamless two-way wireless radio communication link between a cellular phone (transmitter) and the cellular system. Each cellular phone includes a radio frequency (RF) receiver for receiving forward channel communications from a base station and a transmitter for transmitting reverse channel communications to the base station. The forward and the reverse channel communications use separate frequency bands so that simultaneous transmissions in both directions are possible.

Each base station includes a receiver for receiving reverse channel communications from a plurality of cellular transmitters and a transmitter for transmitting forward channel communications to a plurality of cellular transmitters. Adjacent cells are assigned different frequency channels to avoid interference. The number of frequency channels available for communications is limited. Time division multiple access (TDMA) or frequency division multiple access (FDMA) communication techniques may be employed to increase the number of simultaneous calls handled by a cellular system.

In conventional cellular systems, base station controllers (BSC) monitor and control one or more base stations. The number of base stations is typically between several tens to several hundreds. A base station controller performs frequency administration, control functions for each base station and exchange functions. Base station controllers assign RF carriers (channels) to support calls, coordinate the handoff of cellular communications between base stations and monitor and report on the status of each base station under its control. Base station controllers may be located at the same site as a base station or remote from it. Base station controllers and the base stations which they support form a functional unit referred to as the base station subsystem (BSS).

A mobile services switching center (MSC) provides the interface between the cellular system and the public switched telephone network (PSTN). The MSC provides switching exchange services for routing calls from the fixed PSTN network through the BSC and base stations to individual cellular transmitters.

An operation and maintenance center (OMC) controls traffic load and error messaging for the BSCs and the base stations and interfaces both with the MSC switches and the BSCs.

Analog cellular telephones in the United States generally adhere to the Advance Mobile Phone Service (AMPS) protocol as defined in the EIA/TIA 553 specification. The cellular telephone infrastructure coordinates the transmissions of the mobile cellular telephones. Cellular base stations send commands to the cellular telephones directing them to transmit at certain times and at certain frequencies. When a base station initiates communication with a cellular telephone, it sends the cellular telephone a mobile station control message with a page order on its forward control channel. The cellular telephone sends a page response message on the reverse control channel. After a call is setup and the cellular telephone and the cellular base station are communicating on the reverse and forward voice channels respectively, the cellular base station may send a mobile station control message to the telephone on the forward voice channel to order the telephone to a new frequency, change its power, or command it to respond to verify it is still communicating.

An analog cellular telephone conforming to the AMPS protocol forms a baseband signal consisting of an analog voice signal in the 300 to 3000 Hz frequency range and a supervisory audio tone (SAT) at 5970, 6000, or 6030 Hz. The baseband signal is frequency modulated to form an RF signal. The instantaneous frequency deviation due to voice modulation is less than +/−12 kHz. The instantaneous frequency deviation due to SAT modulation is typically +/−2 kHz. The SAT tone is always present. The voice signal comes and goes depending upon how loud the user of the cellular telephone is speaking.

Digital cellular telephones transmit voice information in a digital format rather than in an analog format. For a given call, a reverse digital traffic channel (RDTC) carrier frequency and slot designation to be used are received by the digital cellular telephone in a message from the base station. At call setup, this message is received on a forward control channel, and for a handoff, the forward traffic channel is used. The RDTC has a center frequency, slot timing, carrier modulation, data format and communications protocol as defined by the TIA/EIA IS-54 or IS-136 specifications (hereafter referred to generically as IS-136).

During an in-progress call, a digital cellular telephone transmits voice data to the appropriate base station using the RDTC. The digital cellular telephone does not transmit continuously on its RDTC, but instead transmits in bursts which are adjusted in time to arrive at the base station during a particular time slot. The use of non-overlapping receive time slots at the base station allows more than one mobile station to have simultaneous in-progress calls to a given base station on a given carrier frequency, using a time-division multiple access (TDMA) technique. More than one transmitter can use the same carrier frequency and time slot, but it is intended that the path loss between any two such transmitters is large enough not to cause unacceptable interference at the desired receiver.

Locating Cellular Telephones

Cellular telephones provide unique challenges for security and privacy considerations. Because the cellular transmissions are broadcast out over the open airways, cellular transmissions may be intercepted for unscrupulous purposes. Cellular telephones may be stolen or their identifiers (MIN/ESN identification codes) misappropriated. In response to these security concerns, cellular providers have sought to combat improper use by providing cellular telephone location systems for use in conjunction with a cellular communication system.

Typically, a cellular telephone location system makes use of triangulation or trilateration (hyperbolic) techniques to locate a selected cellular transmitter. The position of a cellular transmitter can be determined using time difference of arrival (TDOA) information based on signal arrival-time measurements for a transmitted signal received at three or more receiving sites. In a system employing a trilateration technique, multiple receiving sensors (three or more) measure the time of arrival of the same transmitter signal. The time of arrival measurements at the receiving sensors may be transmitted to a central processor where the time difference of arrival data is calculated and used to perform an estimation of the location and velocity of the transmitter.

The estimation typically includes forming hyperbolas from the TDOA calculations between the three or more receiving sensors. Transmitter location is estimated from the intersection of two or more independently generated hyperbolas determined from three or more receiving sensors. Methods for determining RF transmitter location based on time difference of arrival are discussed in greater detail in "Statistical Theory of Passive Location Systems" by Don J. Torrieri (IEEE Transactions on Aerospace and Electronic Systems, Vol. AE, 5–20, No. 2, March 1984, pp. 183–198) which is expressly incorporated herein by reference.

In addition to locating illegal phones, location systems may be used to locate callers placing calls into the emergency telephone system (911) or callers seeking roadside assistance through the cellular communication system, for vehicle or package tracking, for cellular phone billing based on location and for various other law enforcement purposes. Recognizing the importance of location support, the FCC recently mandated that all cellular providers be capable of locating 911 callers to within 125 meters by the year 2001.

The widespread promulgation of cellular telephones has resulted in ever increasing numbers and volume of cellular communication traffic. Bandwidth between cellular base stations, the base station controllers and the MSCs is at a premium. Accordingly, bandwidth saving techniques for minimizing the bit rates required to support operations such as cellular telephone location may substantially reduce costs across an entire cellular system.

SUMMARY OF THE INVENTION

In general, in one aspect, the invention features an apparatus for measuring the time difference of arrival between two received signals, where each received signal is a time delayed version of a transmitted signal as intercepted at two different sensors. The transmitted signal is generated by a radio frequency transmitter where the transmitted signal consists of a frequency modulated voice signal plus audio tone. The audio tone has a phase that varies with time. The apparatus includes a remote processor including a decoder and correlator and a first and second sensor. Each sensor includes a receiver for receiving a received signal and generating a receiver output signal including an audio tone and a voice signal, an encoder for operating on the receiver output signal to generate an encoded signal where the audio tone of the receiver output signal is modeled as having a specific phase at a specific time, and a means for transferring the encoded signal to a remote processor. The remote processor is operable to receive an encoded signal from one of the first and second sensors. The decoder is operable to decode the encoded signal resulting in a reconstructed version of the received signal. The correlator is operable to correlate the reconstructed version of the received signal with a signal received by the other of the first and second sensors to derive time difference of arrival data associated with the arrival of the transmitted signal at the first and second sensors.

Aspects of the invention may include one or more of the following features. Each sensor may include a decoder that operates on an encoded signal received from another sensor to generate a reconstructed signal representative of a received signal received at the other sensor, and a correlator for measuring the time difference of arrival between the reconstructed signal and a received signal at a respective sensor. The signal correlated with the reconstructed version of the received signal may be a reconstructed version of a received signal received at another sensor. The remote processor may be co-located with one of the first and second sensors and the signal correlated with the reconstructed version of the received signal may be the receiver output signal at a co-located sensor.

Each sensor may further include an analog to digital converter for operating on the receiver output signal to generate a digitized signal including a sequence of samples representative of the receiver output signal. Each sample may consist of one or more bits. The digitized signal may have a bit rate proportional to a number of bits per sample and a number of samples in a given time interval. The sensor may include a sampling controller for controlling sampling of the receiver output signal by the analog to digital converter wherein the encoder operates on the digitized signal to generate the encoded signal which has a bit rate lower than the bit rate of the digitized signal.

The sampling controller may include a time standard at each sensor and the central processor may include a command-issuing controller for issuing a tasking command to each time standard indicating a time when the analog to digital converter is to generate a sample of the digitized signal. The time standard may include a global positioning system receiver for synchronizing the time standards at each sensor. The sampling controller may include a time standard at each sensor for recording a time when any sample of the digitized signal is generated.

The encoder may include a signal characteristic monitor for detecting signal characteristics of a received signal. The remote processor may include a command issuing controller for issuing a tasking command to the signal characteristic monitor of each encoder indicating a predefined signal characteristic of the received signal and upon detecting the predefined signal characteristic, the signal characteristic monitor may prompt its respective encoder to generate a time stamp associated with an occurrence of the predefined signal characteristic for transfer to the remote processor.

The encoder may encode the receiver output signal by encoding both the audio tone and the voice signal. The sensors may further include a decoder for decoding the encoded signal generated at the sensor thereby generating a reconstructed signal and a correlator for measuring an encoding timing error between the reconstructed signal and the receiver output signal where the encoding timing error may be transferred to the remote processor to be combined with the output of the correlator in the remote processor to generate a more accurate determination of the time difference of arrival for the transmitted signal at the first and second sensors.

The encoders may operate on the receiver output signal to measure a phase of the audio tone at a predetermined time or the time when the audio tone is at a predetermined phase.

Each receiver may include two or more spatially diverse antennas each coupled to two or more downconverters whose outputs are coupled to a beamformer whose single output constitutes the receiver output signal.

In another aspect, the invention provides a sensor for measuring the time difference of arrival between two received signals, each received signal being a time delayed version of a transmitted signal as intercepted at two different sensors where the transmitted signal is generated by a radio frequency transmitter. The sensor includes a receiver which receives a received signal and generates a receiver output signal, a decoder which decodes an encoded signal transferred from another sensor to generate a reconstructed signal representative of the transmitted signal received at the other sensor and a correlator for correlating the reconstructed signal and the receiver output signal to determine a time difference of arrival of the receipt of the transmitted signal at the respective sensors. Aspects of the invention include one or more of the following features. The sensor may further include an encoder for operating on the receiver output signal to generate an encoded signal where the audio tone of the receiver output signal is modeled as having a specific phase at a specific time and a network interface for communicating with a network for transmitting the encoded signal to another sensor. The sensor may include a signal quality monitor for monitoring the signal quality of the received signal and a central processor including a processor controller for receiving signal quality results from the signal quality monitor in each sensor. The processor controller may select a reference sensor based on the signal quality results and may prompt the reference sensor to transfer its encoded signal to another sensor.

The signal quality monitor may include a decoder for decoding the encoded signal generated by the sensor to synthesize a local reconstructed signal representative of the receiver output signal and a correlator for determining signal quality as a measure of similarity between the local reconstructed signal and the receiver output signal.

An encoder for a sensor may only encode the receiver output signal if the sensor is selected as a reference sensor by the central processor. Each sensor may encode and pass to another sensor an encoded signal and determine time difference of arrival data. The central processor may include an assignment controller for assigning weights to time difference data determinations made at each sensor so that a more accurate determination of a time difference of arrival for the received signals may be made. The processor controller may select a reference sensor with the highest signal-to-noise power ratio, the least amount of co-channel interference, or the least amount of multi-path interference as measured by the signal quality monitor, as measured by the signal quality monitor.

In another aspect, the invention provides an apparatus for measuring the time difference of arrival between two received signals including first and second sensors and a central processor. Each sensor may include a receiver for receiving a received signal and generating a receiver output signal, an analog to digital converter for operating on the receiver output signal to generate a digitized signal including a sequence of samples representative of the receiver output signal where each sample consists of one or more bits and the digitized signal has a bit rate proportional to a number of bits per sample and a number of samples in a given time interval, and an encoder for operating on the digitized signal to generate an encoded signal which has a bit rate lower than the bit rate of the digitized signal. The central processor may include a decoder that operates on encoded signals received from each sensor to generate reconstructed signals representative of the received signals and a correlator for measuring the time difference of arrival between the reconstructed signals. Aspects of the invention may include one or more of the following features. The transmitted signal may consist of a digital communication signal consisting of a sequence of symbols, and where the receiver output signal is encoded according to an occurrence of a symbol of the receiver output signal at a specific time. The encoder may model the receiver output signal according to recovered symbols, carrier phase and frequency.

In another aspect, the invention provides a method for reducing network bandwidth in a cellular communication system having a plurality of remote cells each including a sensor for determining time difference of arrival measurements between two received signals. The method includes receiving a received signal from a cellular telephone at two remote sensors. An arrival signal is generated at each remote sensor including arrival information associated with the received signals. The arrival signal has a first bit rate associated therewith. The arrival signal is modeled based on one or more signal characteristics to produce an encoded arrival signal. The encoded arrival signal has a second bit rate, where the first bit rate is greater than the second bit rate. The encoded arrival signal is transmitted to a central processing facility where the encoded arrival signals are decoded to reconstruct the arrival signals. The reconstructed arrival signals are correlated to determine time difference of arrival data.

Aspects of the invention may include one or more of the following features. The method may include determining a reference arrival signal from the encoded arrival signals and correlating an arrival signal associated with the remote sensor that did not produce the reference arrival signal and the reference arrival signal to compute time difference of arrival data. The reference signal may be selected based on quality information gathered at the remote sensor. The reference signal may be distributed to each other sensor for correlation with an arrival signal at the other sensor. Each sensor may calculate time difference of arrival data based on the reference signal and its received signal. Each calculated time measurement may be weighted based on signal quality to more accurately determine the time difference of arrival for the received signals.

The transmitted signal may consist of a frequency modulated voice signal plus audio tone and the arrival signal may be modeled based on the voice signal and the phase, frequency and amplitude of the audio tone. The received signal may be a digital communication signal received from a digital cellular telephone and where the received signal may be encoded based on a measured symbol epoch for the received signal. The correlating step may be accomplished remotely at the sensor.

In another aspect, the invention provides an apparatus for measuring the time difference of arrival between two received signals and includes a master time source for generating a master time source signal containing timing information and two sensors. Each sensor includes a receiver for receiving the transmitted signal and generating a receiver output signal, a digitizer for digitizing the receiver output signal to produce a digitized signal, and a time standard to control when the digitizer samples. The time standard may include a timing signal. The sensor may include a master time source receiver to receive the master time source signal and to measure the time difference data between the timing information in master time source signal and the timing signal, and a network interface for transmitting the time difference data and a representation of the digitized signal to a remote processor. The remote processor may include a correlator which measures the time difference of arrival between the two digitized signals from the two sensors and time difference of arrival engine which operates on the time difference data provided from each sensor and the time difference of arrival determined by the correlator to determine the time difference of arrival between the two received signals.

Aspects of the invention may include one or more of the following features. The master time source may be a GPS satellite and the master time source signal may be a GPS signal transmitted from the GPS satellite.

In another aspect, the invention provides an apparatus for measuring the time difference of arrival between two received signals and includes first and seconds sensors. Each sensor includes a receiver for receiving a received signal and generating an receiver output signal, a demodulator for demodulating the receiver output signal and generating a demodulator output signal, a filter for limiting the bandwidth of the demodulator output signal and generating a filter output signal, an analog to digital converter operating on the filter output signal for generating a digitized signal consisting of a sequence of samples, a time standard to control when the analog to digital converter generates samples, and network interface for communicating with a network to transmit a representation of the digitized signal to a remote processor. The remote processor may include a correlator which operates on the two digitized signals to measure the time difference of arrival between the two received signals.

In another aspect, the invention provides a method for measuring the time difference between two clocks at two different sites where each site is at a known location and includes a Global Positioning System (GPS) receiver capable of receiving a GPS signal from a GPS satellite where the GPS signal contains timing information. The method includes receiving a GPS signal at each site from a GPS satellite, determining a first time difference between a clock at a first site and the timing information of the GPS signal received at the first site, determining a second time difference between a clock at a second site and the timing information of the GPS signal received at the second site and computing the time difference between the clock at the first site and the clock at the second site by subtracting the first time difference from the second time difference.

Among the advantages of the invention are one or more of the following. Bandwidth reduction may be realized in the transmission of signals required to support time difference of arrival applications. Time difference of arrival data may be calculated at a remote sensor based on receipt of a reference signal, thus allowing for reduced bandwidth consumption between sensors and a central processing facility. Any encoding errors induced by the bandwidth reduction techniques disclosed herein may be compensated for in order to improve TDOA calculations. TDOA errors due to sensor-to-sensor time synchronization errors may be reduced or eliminated. TDOA estimation accuracy may be greatly increased by using two or more reference signals. Under poor signal conditions, precision encoding may be used for improved TDOA estimation.

Other features and advantages of the invention will become apparent from the following description and from the claims.

BRIEF DESCRIPTION OF THE DRAWING

FIG. 1 is a block diagram of a time difference of arrival system using remote signal correlation according to the invention.

FIG. 2 is a block diagram of an encoder according to the invention.

FIG. 3 is a block diagram of a delta modulation voice encoder according to the invention.

FIG. 4 is a block diagram of a pulse code modulation voice encoder according to the invention.

FIG. 5 is a block diagram of decoder according to the invention.

FIG. 6 is a block diagram of delta modulation voice decoder according to the invention.

FIG. 7 is a block diagram of a pulse code modulation voice decoder according to the invention.

FIG. 8 is a flow diagram for a method of implementing network bandwidth reduction while computing time difference measurements according to the invention.

FIG. 9 is a block diagram for a time difference of arrival system incorporating timing error correction circuitry according to the invention.

FIG. 10 is block diagram for an alternative time difference of arrival system configuration using local signal correlation according to the invention.

FIG. 11 is a flow diagram of a method for performing local correlation according to the invention.

FIG. 12 is a beamformer according to the invention.

FIG. 13 is a block diagram for an alternative embodiment for processing the demodulated output of a receiver according to the invention.

DETAILED DESCRIPTION

Referring now to FIG. 1, a time difference of arrival (TDOA) measurement system 5 includes two or more sensors 24 and 124, respectively, coupled by a network 40 to a central processor 46 which collectively measures the difference in time that a transmitted signal 12 takes to propagate from an RF transmitter 10 to the various sensors.

Radio Frequency (RF) transmitter 10 generates a transmitted signal 12 that is broadcast using a transmit antenna 11. RF transmitter 10 may be of the form of a cellular telephone, or other radio frequency transmitter. Transmitted signal 12 may be of the form of a baseband signal that frequency modulates a carrier. For the purposes of these discussions, an analog cellular telephone system including sensors for monitoring reverse voice channel communications will be described. Those of ordinary skill in the art will recognize that the teachings of the present invention are equally well suited to reverse control channel transmissions or digital cellular telephone systems including TDMA applications that are characterized by digital forms of transmitted signals. Digital applications are discussed in greater detail below in the alternative embodiments section of this specification.

For analog cellular telephones, transmitted signal 12 may include a voice component in the 30 to 3000 Hz range v(t) plus an audio tone in the 5970 to 6030 Hz range, s(t). The voice component has appreciable amplitude when the user of the transmitter is speaking or otherwise broadcasting into a microphone (not shown) in RF transmitter 10.

The audio tone may be modeled by:

$$s(t)=A\cos[2\pi ft+\theta] \tag{1}$$

Transmitted signal 12 travels at the speed of light to both sensor A 24 and sensor B 124. Since RF transmitter 10 may be closer to one sensor than the other, the time when the signal arrives at sensor A 24 may be different (the time associated with the arrival of received signal 13 at sensor A 24) from when the signal arrives at sensor B 124 (the time associated with the arrival of received signal 113 at sensor B 124).

Each sensor may be similarly configured. For the purposes of these discussions, reference will be made to equipment and signals as configured in two identical sensors. One or more sensors may include lesser equipment depending on the particular user requirements and the location where calculations for time difference of arrival are performed. Sensors 24, 124 may or may not be collocated with a cellular base station.

Received signal 13, 113 is collected by receive antenna 14, 114 and processed by receiver 15, 115 which selects a narrow band portion of the radio frequency spectrum which contains the received signal. Narrowband intermediate frequency signal 16, 116 is converted to a sequence of samples by digitizer 17, 117. The sequence of samples constitutes digitized signal 21, 121. The time when the digitizer generates a sample may be governed by a timing signal 19, 119 which is generated by a time standard 18, 118.

Alternatively, the digitizer may be programmed to sample at a predefined time or upon the occurrence or detection of a predefined signal characteristic. A tasking command 26 may be received from controller 45 in central processor 46 through communication network 40. Tasking command 26 may indicate a time to perform a sample or a signal characteristic to monitor. Sensor 24, 124 may include a detector (not shown) for monitoring signal characteristics as defined by tasking command 26. The operation of sensor 24, 124 in response to tasking instructions from central processor 46 is described in greater detail below in association with FIG. 10.

Time standard 18, 118 may be implemented with an atomic clock, a GPS receiver or an oven controlled crystal oscillator, any of which provide a sufficiently high degree of precision time definition to allow for accurate time difference measurements. The time when a sample is generated may be provided as a time stamp 22, 122 to encoder 23, 123. Time stamp 22, 122 may be associated with any sample, such as the first sample in sequence or the last sample of a sequence. When tasked by central processor 46 to sample receiver output signal 16, 116 at a predefined time t, no time stamp 22, 122 is required to be provided to encoder 23, 123 for transmission to central processor 46.

Encoders

Encoder 23, 123 operates on the digitized signal 21, 121 to reduce the number of bits necessary to represent the digitized signal. There are many ways to compress digitized signals and any acceptable technique can be used that preserves the time of arrival information contained in the digitized signal. Referring now to FIG. 2, for frequency modulated signals containing both voice and SAT components, encoder 23, 123 may include a SAT encoder 200, a voice encoder 202, and a FM demodulator 204. Digitized signal 21, 121 is FM demodulated by FM demodulator 204 yielding a baseband signal. Voice encoder 202 reduces the number of bits necessary to represent the baseband signal in the 0 to 3 kHz frequency range. SAT encoder 200 analyzes the SAT component of the baseband signal output of FM demodulator 204 by measuring characteristics of the SAT which may include: SAT amplitude A, frequency f, and phase θ. The SAT may be modeled according to the following formula:

$$S(t)=A\cos[2\pi ft+\theta] \quad (2)$$

There are several methods of encoding a voice signal and FIG. 3 illustrates a common technique referred to as delta modulation. The FM baseband signal from FM demodulator 204 may be applied to a low pass filter 220 which isolates the voice information in the 0 to 3 kHz frequency range. The output of low pass filter 220 may be applied to integrator 221 forming an instantaneous phase signal 222. A difference circuit 223 may be used to determine the difference between phase signal 222 and a phase estimate signal 227. The output of difference circuit 223 may be applied to a quantizer 224 which outputs a "1" bit if the difference is positive or a "0" bit if the difference is negative resulting in a bit sequence which constitutes the encoded voice signal. Typical bit rates for delta modulation voice are 16,000 to 32,000 bits per second. Phase estimate signal 227 may be formed by mapping the output bits of bit quantizer 224 where "1" bits may be mapped to at +1 value and "0" bits to a −1 value in mapping circuit 228. The resultant signal may be provided to a low pass filter 225 whose output is integrated by integrator 226.

FIG. 4 depicts another voice encoding scheme commonly referred to as pulse code modulation (described in part by Carlson, Communication Systems, 1968, McGraw-Hill, pp. 444–453). The FM baseband is filtered 230 to recover the voice signal and then integrated by an integrator 231 to convert the instantaneous frequency signal into an unwrapped phase signal 232. Since a phase value of 1° and 361° have the same meaning, a modulo 360° operation 233 is performed so that all phase angles lie between −180° and +180°. An N-bit quantizer 234 then encodes the modulo 360° phase samples. For example, a three-bit quantizer running at 8000 samples per second has a 24,000 bits per second bit rate. For quantizer 234, phase values from 0° to 45° may be assigned to code word "000", 45° to 90° to "001", 90° to 135° to "010", etc. Other levels of quantization, number of levels, and bit rates may be selected as is known by those skilled in the art.

Both delta modulation and pulse code modulation voice encoders benefit by encoding the instantaneous phase signal rather than the instantaneous frequency signal. The instantaneous phase signal has a higher correlation coefficient and a lower doppler frequency error. The benefit of a high correlation coefficient will be discussed in the subsequent section on correlators.

The voice isolation low pass filters 220 (FIG. 3) and 230 (FIG. 4) may also reduce the sample rate of their respective outputs commensurate with their respective bandwidths using a decimation technique. Accordingly, bit quantizer 224 (FIG. 3) and 234 (FIG. 4) may run at low sample rates resulting in an encoded voice signal having a low bit rate. Reconstruction filters in the voice decoders described below may increase the sample rate of the received encoded signals using interpolation techniques, resulting in reconstructed voice signals having an appropriate sample rate.

Decoding

Referring again to FIG. 1, encoded signal 25 may be passed to central processor 46 or to another sensor depending on the technique of measuring TDOA. Decoding of the encoded signal therefore may be required both locally and remotely.

Decoder 27 in sensor A 24 operates on encoded signal A 25 from encoder 23 to form reconstructed signal A 28. Likewise, decoder 41 in central processor 46 also operates on encoded signal A 25 passed through communication network 40 from encoder 23 to form reconstructed signal A 42.

Decoder 127 in sensor B 124 operates on encoded signal B 125 from encoder 123 to form reconstructed signal B 128. Likewise, decoder 141 in central processor 46 also operates on encoded signal B 125 passed through communication network 40 from encoder 123l to form reconstructed signal B 142.

Referring now to FIG. 5, a decoder for forming reconstructed signals for an analog cellular telephone system may include a voice decoder 300, a SAT decoder 302, and an FM modulator 304.

SAT decoder 302 synthesizes a SAT by implementing Eq. (2) based upon the measured SAT amplitude, phase, and frequency contained within the encoded signal. Voice decoder 300 operates on the encoded voice signal to synthesize the reconstructed voice signal. The synthesized SAT signal is added by summation circuit 303 to the reconstructed voice signal to form a synthesized FM baseband signal which in turn is applied to the FM modulator 304 to form the reconstructed signal. FM modulator 304 may be bypassed resulting in reconstructed signals of the form of FM baseband signals, resulting in the correlation FM baseband signals in correlator 43 (FIG. 1) as opposed to pre-detection intermediate (I/F) signals. The processing of FM modulated signals is discussed in greater detail below in association with FIG. 13.

Voice decoder 300 performs the inverse of voice encoder 202 of FIG. 2. Voice decoder 300 may be implemented in several ways. Example of two methods for decoding voice signals are described below in association with FIGS. 6 and 7.

Referring to FIG. 6, a delta modulation decoder includes a mapping circuit 235 and low pass filter 240. Delta modulation encoded voice signal "1" bits are mapped by mapping circuit 235 to +1 values and "0" bits are mapped to −1 values. The output of mapping circuit 235, a bipolar signal, is applied to a reconstruction low pass filter 240 to produce the reconstructed voice signal.

Referring now to FIG. 7, a pulse code modulation decoder includes a quantizer 242 and differentiator 244. A pulse code modulation encoded voice signal is converted to a reconstructed voice signal by inverse N-bit quantizer 242, whose output is operated on by a modulo 360° differentiator 244 to yield a reconstructed voice signal.

Correlators

Referring again to FIG. 1, sensors 24, 124 and central processor 46 may be configured to include one or more correlators. The correlators may be of two basic types, local correlators and remote correlators.

Local correlators, such as correlator 29, 129, receive as input a local digitized signal which reflects the received signal at the sensor and a reconstructed version of the digitized signal after encoding by local encoder 23, 123 respectively. The reconstructed signal is generated by local decoder 27, 127. Correlator 29 in sensor A 24 measures the time difference of arrival $(\tau_A - \tau_{AE})$ 30 between digitized signal A 21 and reconstructed signal A 28. Correlator 129 in sensor B 124 measures the time difference of arrival $(\tau_B - \tau_{BE})$ 130 between digitized signal B 121 and reconstructed signal B 128. The output of a local correlator is a time error signal which may be transmitted to central processor 46 for further use in deriving time difference of arrival data.

Remote correlators operate on reconstructed waveforms provided from various sensors. For example, remote correlator 43 in central processor 46 measures the time difference of arrival $(\tau_{AE} - \tau_{BE})$ 44 between reconstructed signal A 42 and reconstructed signal B 142.

The outputs from a correlator may include the time delay between the two input signals, the power of each input signal, and the correlation coefficient between the two input signals. If the input signals are not already in a complex representation, they may be filtered so that they have in-phase and quadrature components. The complex signals, $x_A(n)$ and $x_B(n)$, may be cross correlated to calculate the correlation coefficient:

$$\rho(m, \omega) = \frac{\left| \frac{1}{N - |m|} \sum_{n=\max(m,0)}^{\min(N-1, N-1+m)} x_A(n) x_B(n-m) e^{-j\omega n} \right|}{\sqrt{P_A P_B}} \quad (3)$$

where m is the time delay between the two signals in samples, ω is the doppler frequency difference between the two signals in radians, N is the number of samples in the collection interval, and $P_A$ and $P_B$ are the powers of the two signals where:

$$P_A = \frac{1}{N} \sum_{n=0}^{N-1} |x_A(n)|^2, \; P_B = \frac{1}{N} \sum_{n=0}^{N-1} |x_B(n)|^2 \quad (4)$$

The lag, $m_m$ and frequency shift, $\omega_m$, which maximizes the correlation coefficient may be found. A cubic spline may be fitted to three correlation coefficients $\rho(m_m-1, \omega_m)$, $\rho(m_m, \omega_m)$, and $\rho(m_m+1, \omega_m)$. More than three correlation coefficients may be used. Thereafter, the peak of the cubic spline function may be found, yielding the time difference in arrival between the two signals in samples, $m_s$ (not necessarily an integer), and the peak correlation coefficient, $\rho_s$. The peak correlation coefficient is an indicator of the fidelity of the correlation. Values near 1 mean that the signal-to-noise power ratio is high and the co-channel interference is low for both input signals. Values near zero mean that one or both signals are corrupted by noise, interference, or multipath. The time difference in arrival between the two signals in seconds is:

$$\tau_A - \tau_B = \frac{m_S}{F_S} \quad (5)$$

where $F_s$ is the sample rate in samples per second. The doppler frequency shift in hertz is:

$$f_A - f_B = \omega_m \frac{F_S}{2\pi} \quad (6)$$

The doppler frequency shift can be used to determine the velocity (speed and heading) of the transmitter.

Time Difference Measurements

As was described above, bandwidth reductions for data exchange over network 40 may be realized by minimizing the bit rates for encoded signals required to support the time difference of arrival process. Bit rates may be reduced by selective encoding techniques as well as remote processing. Referring now generally to FIGS. 8–12, a series of methods are presented for minimizing network bandwidth while achieving precise time difference of arrival measurements in a cellular system.

TDOA without Error Correction

The measured phase $\theta_A(t_1)$ of the SAT at sensor A at measurement time $t_1$ is:

$$\theta_A(t_1) = 2\pi f(t_1 - \tau_A) + \theta \quad (7)$$

The measured phase $\theta_B(t_2)$ of the SAT at sensor B at measurement time $t_2$ is:

$$\theta_B(t_2) = 2\pi f(t_2 - \tau_B) + \theta \quad (8)$$

Referring now to FIGS. 1 and 8, a method for implementing network bandwidth reduction while computing the time difference of arrival between received signals at first and second sensors is achieved by measuring (402) and (404) phases of the supervisory audio tones, $\theta_A(t_1)$ and $\theta_B(t_2)$, at specific times $t_1$ and $t_2$. The phase information may be relayed to a central processor 46 (406) for use in determining the time difference of arrival of the received signals. In this method, time difference of arrival measurements are determined as a function (408) of the phase difference between the two audio tones received at the respective sensors. The time difference of arrival can be computed according to:

$$\tau_A - \tau_B = t_1 - t_2 + \frac{\theta_A(t_1) - \theta_B(t_2)}{-2\pi f} \quad (9)$$

where f is the SAT frequency.

The phase of the SAT at sensor A 24, $\theta_A(t_1)$, is measured by encoder 23 and provided as an input (encoded signal A 25) to decoder 41 in central processor 46 through network 40. Similarly, the phase of the SAT at sensor B 124, $\theta_B(t_2)$, is measured by encoder 123 and provided as an input (encoded signal B 125) to decoder 141 in the central processor through network 40. Decoder 41, 141 forwards the phases $\theta_A(t_1)$ and $\theta_B(t_2)$ and times $t_1$ and $t_2$ to correlator 43 which in turn generates the time difference $(\tau_A-\tau_B)$ per Eq. (9) representative of the time difference of arrival of the received signal at sensors 24 and 124.

Alternatively, the SAT phase may be measured at both sensors at the same time, $t_1=t_2$, so that only the SAT phases, $\theta_A(t_1)$ and $\theta_B(t_2)$ need to be transferred to the central processor. In another embodiment, a measurement of the times $t_1$ and $t_2$ when the SAT phases reach a prescribed value $\theta_1$, $\theta_A(t_1)=\theta_B(t_2)=\theta_1$, may be performed so that only those times, $t_1$ and $t_2$, are required to be transferred to the central processor.

Encoding with Error Correction

The modeling of the digitized signal based on SAT phase alone may provide less than optimal results in low signal-to-noise ratio environments. Accordingly, encoding more than the SAT phase or measuring the encoding error may be required.

In one embodiment, sensor 24, 124 may be configured to compensate for encoding error and include decoder 27, 127 and correlator 29, 129. Decoder 27, 127 operates on the encoded signal to form reconstructed signal 28, 128. Reconstructed signal 28, 128 is identical to the digitized signal 21, 121 except for any information which was lost due to encoding errors. Reconstructed signal 28, 128 is cross correlated with digitized signal 21, 121 in correlator 29, 129 to compute a time error between digitized signal 21, 121 and reconstructed signal 28, 128. The time error will be zero if the encoded signal 25, 125 is an adequate representation of digitized signal 21, 121. This error information for each sensor may in turn be provided over network 40 to correlator 43 in central processor 46. The error information may be used to compute more accurate time difference measurements. The time difference may then be computed at central processor as:

$$(\tau_A-\tau_B)=(\tau_{AE}-\tau_{BE})+(\tau_A-\tau_{AE})-(\tau_B-\tau_{BE}) \quad (10)$$

where the first term, $(\tau_{AE}-\tau_{BE})$ 44, is determined by correlator 43 in central processor 46, the second term, $(\tau_A-\tau_{AE})$, is determined by correlator 29 in sensor A 24 as the sensor A encoding error 30, and the third term, $(\tau_B-\tau_{BE})$, is determined by correlator 129 in sensor B 124 as the sensor B encoding error 130.

High Precision Encoding

The digitized signal input to encoder 23, 123 may be modeled using the measured SAT phase, frequency and amplitude. In a high signal-to-noise ratio environment, this may lead to a higher precision reconstructed signal and necessarily to higher precision time difference determinations. This is principally due to the FM improvement or wideband noise reduction phenomena of the encoder (described in Carlson, Communication Systems, 1968, McGraw-Hill, pp. 328–336). Alternatively, the digitized signal may be modeled by a combination of SAT and voice encoded signals. When encoding both voice and SAT, a more precise model for the digitized signal output from digitizer 17, 117 may be achieved which in turn leads to more precise time difference measurements. Examples of signal characteristics which may be used to model the digitized signal include: the frequency of the carrier of the received signal, the amount of frequency deviation due to the voice signal, voice samples, and the phase, amplitude, and frequency of the supervisory audio tone.

Timing

The methods described above provide for a measurement of the time difference of arrival for a signal received at different sensors. In order to correlate the information, time must be either expressly or inherently associated with the digitized signal generated at a given sensor. There are at least three different ways to associate time with the digitized signal. The first option is for time standard 18, 118 to record a time, $t_m$, 22, 122, when a sample of the digitized signal is generated. If the time between samples is T, then the time of any other sample, $t_n$, may be computed as a function of the difference between sample number n and the sample with the time stamp, m, using:

$$t_n=t_m+T(n-m) \quad (11)$$

Another way to associate time with the digitized signal is for controller 45 at the central processor to send a tasking command 26 to time standard 18, 118 to start each digitizer 17, 117 at the same time. In this embodiment, only the encoded signal A 25 and encoded signal B 125 are required to be passed (e.g. the phase of the SAT signal) and a time stamp is not required since the first sample of digitized signal 21 and the first sample of digitized signal 121 correspond to the same absolute time.

A third way of associating time with the digitized signal does not require that the time standards in the two sensors be precisely synchronized, but rather only the difference between their clocks, $t_c$, is required to be known or measured. The calculations for time difference may be adjusted by $t_c$ so that the time difference of arrival accuracy is preserved. For example, if the time error at sensor A were $e_A$ and the time error at sensor B were $e_B$, then the amount of TDOA correction would be $t_c=e_A-e_B$.

Referring now to FIG. 9, a method of eliminating time standard errors for a TDOA system is described. RF transmitter 10 broadcasts a transmitted signal s(t) which is intercepted as received signal A, $s(t-\tau_A)$, at sensor A 24 with a delay $t_A$ seconds due to the distance between the RF transmitter and sensor A. Likewise the transmitted signal arrives at sensor B 124 with a delay $t_B$ seconds forming received signal B, $S(t-\tau_B)$. The received signals are received (by receiver 15, 115) and digitized (by digitizer 17, 117) forming the digitized signal A, modeled as $s(t-\tau_A-e_A)$; and digitized signal B, modeled as $s(t-\tau_B-e_B)$; where $e_A$ is the timing error of the sensor A time standard (oscillator) 18 and $e_B$ is the timing error of the sensor B time standard (oscillator) 118. The digitized signals are encoded (by encoder 23, 123) and the encoded signals are sent to decoders 41 and 141 which reconstruct the received signals. The reconstructed signals are applied to correlator 43 which measures the time difference of arrival between the two received signals producing a TDOA of $\tau_A+e_A-\tau_B-e_B$.

To remove the effects of the timing errors of the time standards (oscillators) in the various sensors, GPS receivers 672 and 682 intercept the GPS signal from a GPS satellite 668. Although the GPS receivers may be capable of receiving a GPS signal from several GPS satellites, all that is necessary is that both GPS receivers 672 and 682 intercept the same satellite. GPS satellites dither the timing information contained within their GPS signals using a technique called selective availability which in turn causes the GPS receivers to produce a timing error of g seconds. The difference between the time produced by the GPS receiver 672 and time standard 18 is measured by a measurement circuit 673 coincident with the collection of the received signal thereby producing a time offset of $e_A$-g for sensor A. Likewise, the difference between GPS receiver 682 and time standard 118 is measured by measurement circuit 683 thereby producing a time offset of $e_B$-g for sensor B. The time offsets from both sensor A and sensor B along with the TDOA information from the correlator 43 are sent to a processor 666 which subtracts the sensor A time offset from the correlator's TDOA and adds the sensor B time offset thereby producing the corrected TDOA of $\tau_A - \tau_B$.

If the GPS receiver in sensor A intercepts satellites 1, 4, 8, and 11 and the GPS receiver in sensor B intercepts satellites 3, 4, and 8, then the time offset may be found for each satellite: $e_A$-$g_1$, $e_A$-$g_4$, $e_A$-$g_8$, and $e_A$-$g_{11}$, and found for sensor B satellites: $e_B$-$g_3$, $e_B$-$g_4$, and $e_B$-$g_8$, all of which are forwarded to the correction processor 666. The correction processor then identifies a GPS satellite which was seen by both sensors, selects it corresponding time offsets, and computes the difference in time offsets to find the oscillator difference error: $t_c = e_A - g_4 - (e_B - g_4) = e_A - e_B$. As indicated before, the oscillator difference error is then subtracted from the correlator's TDOA to produce the corrected TDOA of $\tau_A - \tau_B$.

Timing error correction for the systems described in association with FIG. 1 or FIG. 10 may be achieved using the technique diagramed in FIG. 9.

Local Correlation The correlation of reconstructed signals to derive time difference data may be performed at central processor 46 as described above. Alternatively, correlation may be performed at each individual remote sensor. When local correlation is implemented, time difference data is determined at each remote sensor. The resultant time difference data may thereafter be transferred to the central processor for use in applications such as cellular telephone location systems.

Referring now to FIG. 10, a time difference of arrival system 500 configured for local correlation includes storage device 55 and location processor 56 in central processor 46 and signal quality processor 49, 149, decoder 51, 151, and correlator 53, 153 in sensor 24, 124.

Storage device 55 is configured for receiving encoded signal 25, 125 from sensor 24, 124. Storage device 55 may be used to temporarily store encoded signals from a plurality of sensors associated with received signals corresponding to transmitted signal 12.

Location processor 56 may be any of a variety of applications which require time difference of arrival information as an input. Location processor 56 may use time difference data generated at each sensor to determine the location of a cellular telephone.

Signal quality processor 49, 149 measures signal quality characteristics of digitized signal 21, 121. Signal quality is a function of measured signal characteristics such as: 1) signal-to-noise power ratio; 2) signal-to-co-channel-interference power ratio; 3) degree of fading due to multipath propagation; 4) correlation coefficient between the digitized signal and the local reconstructed signal as determined by a local correlator 27, 127; or 5) the ratio of the largest eigenvalue to the next largest eigenvalue as described in the beamforming discussion below in association with FIG. 12. Sensors report results 48 of their measured signal quality to controller 45. Controller 45 is configured to receive the quality data (results 48) from signal quality processor 49, 149 to determine a reference encoded signal from the encoded signals 25 and 125. The selected reference encoded signal may be transferred to each sensor in anticipation of local correlation. Typically, controller 45 selects the sensor with the highest signal quality as the reference sensor. When the digitized signal has high signal quality, the encoding process as a result of FM improvement, increases the signal-to-noise power ratio even further than could be achieved for a low signal quality signal. To maximize the subsequent correlation coefficient, controller 45 selects one sensor having a high signal quality to act as the reference sensor for signal encoding purposes. The reference encoded signal may be selected from one of the two sensors, sensor A 24 or sensor B 124, for use in determining time difference of arrival data for the transmitted signal received at the respective sensors. Alternatively, a reference encoded signal may be selected from a third sensor, sensor C, and used in determining time difference of arrival data for the transmitted signal received at the sensor A 24 and sensor B 124.

Decoder 51, 151 operate on a received reference encoded signal, generating a reconstructed signal of the selected reference sensor. Specifically, decoder 51 in sensor A 24 operates on encoded signal B 125 passed through communication network 40 from encoder 123 to form reconstructed signal B 128. Decoder 151 in sensor B 124 operates on encoded signal A 25 passed through communication network 40 from encoder 23 to form reconstructed signal A 28.

Correlator 53, 153 perform a correlation on the reconstructed signal associated with the selected reference sensor and a local digitized signal to determine time difference of arrival data. Correlator 53 in sensor A 24 measures the time difference of arrival $(\tau_A - \tau_{BE})$ 54 between digitized signal A 21 and reconstructed signal B 128.

Correlator 153 in sensor B 124 measures the time difference of arrival $(\tau_B - \tau_{AE})$ 154 between digitized signal B 121 and reconstructed signal A 28.

Referring now to FIGS. 10 and 11, a method (600) of performing local correlation of received signals to derive time difference data includes receiving the received signal 13, 113 at sensor 24, 124 (602). Each sensor processes the received signal producing a digitized signal 21, 121 for encoding by encoder 23, 123 (604). A signal quality processor 49, 149 characterizes the signal quality of the digitized signal (606) and transfers results 48 to controller 45 in central processor 46 through network 40 (608).

Coincidently in time, encoder 23, 123 provides an encoded signal 25, 125 to storage device 55 in central processor 46 through network 40 (610). Controller 45 determines a reference encoded signal from encoded signals 25 and 125 based on results 48 (612). Controller 45 coordinates the transfer of the selected reference encoded signal from storage device 55 to each sensor (614). At sensor 24, 124, the reference encoded signal is received at decoder 51, 151 (616) and decoded (618) to yield a reconstructed reference signal. The reconstructed reference signal is a reconstructed version of a digitized signal produced at the selected reference sensor. The reconstructed reference signal is correlated with a local digitized signal by correlator 53, 153 (620). The resultant time difference data 54, 154, representative of the time difference of arrival between the received signal at the local sensor and the received signal at the selected reference sensor, may be transferred to location processor 56 in central processor 46 through network 40 (622).

Those of ordinary skill will recognize that storage device 55 may be eliminated and a reference encoded signal may be transferred directly from a selected reference sensor directly to other sensors through network 40. Controller 45 may provide tasking instructions to a selected reference sensor to provide its respective encoded signal to an identified group of other sensors. The quality determination may occur prior to any encoding at the respective sensors. Based on the quality determination, controller 45 may initiate encoding only at the reference sensor. Accordingly, network bandwidth may be reduced by eliminating the need to transfer any encoded signals to central processor 46. In addition, processing resources in the individual sensors are conserved by only requiring the reference sensor to encode its digitized signal.

Local Correlation Including Local Error Correction

Sensor 24, 124 may include decoder 27, 127 and correlator 29, 129. Decoder 27, 127 and correlator 29, 129 may be used to determine a local encoding error. For example, controller 45 may select sensor A to provide a reference encoded signal. Decoder 151 operates to synthesize reconstructed signal A. Correlator 153 measures the time difference of arrival $(\tau_B-\tau_{AE})$ 154 between the digitized signal 121 and the reconstructed signal A 28. Correlator 29 measures the time difference of arrival $(\tau_A-\tau_{AE})$ 30 between the digitized signal A 21 and the reconstructed signal B 128. The time difference of arrival of the transmitted signal 12 between sensor 24 and sensor 124 including local error compensation would be:

$$(\tau_A-\tau_B)=(\tau_A-\tau_{AE})-(\tau_B-\tau_{AE}) \quad (12)$$

Local Correlation Including Weighted Local Error Correction

The determination of time difference data may be further refined using multiple reference encoded signals. For example, rather than selecting a single reference encoded signal, encoded signals may be transferred between two or more sensors. The encoded signals for a given pair of sensors may be traded, with each sensor generating an intermediate time difference of arrival contribution as described above with reference to Eq. (12). The final time difference of arrival may be calculated as a weighed sum of the respective intermediate time difference of arrival contributions. If the accuracy of computing the time difference of arrival $(\tau_A-\tau_B)_{AB}$ between digitized signal A and reconstructed signal B were $W_{AB}$ and the accuracy of comparing the time difference of arrival $(\tau_A-\tau_B)_{BA}$ between digitized signal B and reconstructed signal A were $W_{BA}$, then the final time difference of arrival would be:

$$\tau_A - \tau_B = \frac{W_{BA}(\tau_A - \tau_B)_{BA} + W_{AB}(\tau_A - \tau_B)_{AB}}{W_{BA} + W_{AB}} \quad (13)$$

If the intermediate time difference of arrival (96 $_A-\tau_B)_{BA}$ is very accurate, then $W_{BA}$ would be a large value. On the other hand, if the intermediate time difference of arrival $(\tau_A-\tau_B)_{BA}$ is subject to errors, then a small value of $W_{BA}$ would be computed so that the intermediate time difference of arrival contribution associated with $(\tau_A-\tau_B)_{BA}$ would be small in Eq. (13). The weights $W_{BA}$ and $W_{AB}$ may be dependent upon the amplitude of the correlation peak and the quality of the signals input to the respective correlator.

Alternative Embodiments
Encoding Digital Cellular Telephone Signals

Referring again to FIG. 1, when received signal 13, 113 is from a digital cellular telephone, an alternate method of representing the digitized signal 21, 121 by encoder 23, 123 is necessary. Encoder 23, 123 is only required to represent the digitized signal during the time slots allocated to the digital cellular telephone. At all other time slots, the assumed value of the digitized signal is zero. The encoder/decoder process must generate a reconstructed signal that preserves the time of arrival information and that correlates with the digitized signal of an RDTC slot. To receive a particular digital cellular telephone's RDTC transmissions, it is first necessary to know the channel (coarse RF carrier frequency) and slot timing of this digital cellular telephone's RDTC. With this knowledge, the RDTC signal received on some carrier frequency with a given slot timing at a geographical location not coincident with the digital cellular telephone's desired base station may be corrupted by the following sources:

1) transmissions of other digital cellular telephones using the same carrier frequency and base station, due to overlap when received at other geographical locations, 2) transmissions of other digital cellular telephones using the same carrier frequency transmitting to other base stations, 3) noise from the receiver, and 4) multipath propagation.

Given the carrier frequency, slot designation, and digital verification color code, for a particular digital cellular telephone's RDTC transmissions, receiver 15, 115 may be tuned to the carrier frequency. The slot timing may be found by correlating in encoder 23, 123 the digitized signal 21, 121 with a symbol synchronization sequence. The correct slot timing may be found at the correlation time delay where a large correlation peak is observed. As a further check that the correct digital cellular telephone's RDTC has been found, the received digital verification color code may be checked against what was expected.

Encoding a particular digital cellular telephone's RDTC transmissions requires recovering the transmitted symbols and estimating and recreating imperfections in the transmitted signal of the particular digital cellular telephone. The transmitted symbols are recovered at the coarse carrier frequency and slot timing derived as described above using standard demodulation for the signal described in IS-136, possibly including the use of an adaptive equalizer. Digital cellular telephone transmission imperfections estimated from the digitized signal are used to make the reconstructed signal a better match to the digitized signal. A model of the digitized signal for a particular slot may include the following measured parameters:

1) symbol epoch (start time of the first symbol in the slot), $T_0$, 2) precise carrier frequency (the difference between the frequency of the carrier and the center tuned frequency of the receiver), f, 3) recovered symbols, y(m) having values 0, 1, 2, and 3 representing phase changes of $\pi/4$, $3\pi/4$, $-3\pi/4$, and $-\pi/4$, 4) carrier phase, $\theta$ 5) symbol period, T 6) carrier feed-through into in-phase and quadrature signals, 7) modulation imbalance between in-phase and quadrature signals, 8) in-phase and quadrature pulse shaping function, s(t), 9) carrier frequency chirp, and 10) carrier amplitude, A.

Time Difference Determination Based on Symbol Epoch

The time difference of arrival between the received signal at a first sensor and a second sensor may be determined by modeling the digitized signal based on the measured symbol epoch in encoder 23, 123 of sensor 24, 124 for one or more slots. The measured symbol epochs may in turn be passed as results 48 to controller 45. Controller 45 may calculate the time difference of arrival as the average of the differences between symbol epochs from sensor A slots and symbol epochs from sensor B slots. The measurement of symbol epoch is described in greater detail in pending patent application Ser. No. 08/729,486, entitled "Bit Characteristics Measurement System for Digitally Modulated Signals" by Kelly D. Hawkes, assigned to the same assignee as the present invention, and expressly incorporated herein by reference.

Time Difference Determination in Digital Systems Including Local and Remote Correlation The techniques described above for the local and remote correlation of time difference data may be used to find the time difference of arrival for digital cellular telephones. If the measurement duration spans just one slot, then encoder 23, 123 may characterize the slot with at least the following parameters: symbol epoch and recovered symbols. For a measurement that spans a plurality of slots, encoder 23, 123 may characterize each slot used by the digital cellular telephone with at least the following parameters: symbol epoch, precise carrier frequency, recovered symbols, and carrier phase. The remaining modeling parameters may be either measured or assumed to be default values specified in IS-136. Decoders 27, 127, 41, 141, and 51, 151 may be used to synthesize reconstructed signals 28, 128, and 42, 142, based upon the modeling parameters contained within encoded signals 25, 125. For example, the reconstructed signal, x(n), for one time slot may be synthesized by:

$$x(n) = v\left(\frac{n}{F_S}\right) A e^{j\left[2\pi f\left(\frac{n}{F_S}\right) + \theta\right]} \quad (14)$$

where $F_s$ is the sample rate of the reconstructed signal. The baseband signal may be described by:

$$v(t) = \sum_{m=0}^{N-1} s[t - (T_0 + mT)] e^{jp(m)} \quad (15)$$

where s(t) is the pulse shaping function, N is the number of symbols in a slot, and the phase sequence may be described by:

$$p(m) = p(m-1) + \frac{\pi}{2} y(m) + \frac{\pi}{4} \quad (16)$$

During slots not assigned to the digital cellular telephone, the reconstructed signal is off: x(n)=0. The entire reconstructed signal consists of several intervals concatenated together, each interval consisting of Eq. (14) which models a particular slot followed by several samples of x(n)=0 which model the slots assigned to other digital cellular telephones. Correlators 29, 129, and 53, 153 may operate on pairs of digitized signals and reconstructed signals to find the time difference between them as previously described.

Beamforming

Referring again to FIGS. 1 or 10, in another embodiment, the number of receiving channels at each sensor may be increased to allow reception of the transmitted signal through spatially diverse antennas at the sensor. Subsequent signal processing may be used to detect the presence of interfering signals, either co-channel or multi-path signals, and to remove their effects through a process of "beamforming" prior to encoding 23, 123. The process of removing co-channel and multi-path signals may be accomplished by combining the outputs from the receiving channels in a complex vector fashion into a composite digitized signal. Beamforming not only removes the effects of interference but also may improve the signal-to-noise power ratio since the signals from each antenna add coherently and the noise adds incoherently. Beamforming may improve the signal-to-interference ratio by forming a composite antenna pattern in the direction of the signal and an antenna pattern null in the direction of the interference. Beamforming may also provide diversity reception so that when the signal in one receiving channel fades, the output of another receiving channel that is not fading can be selected. Adaptive beamforming uses a set of beamforming coefficients which vary with time to adapt to the changing fading, multi-path, or co-channel interference conditions. The output of the beamforming process may provide an improved digitized signal 21. The number of receiving channels used to enhance the invention is variable depending on allowable cost and complexity at the sensor.

Referring now to FIG. 12, a four channel beamformer is shown. Other number of channels may be selected as is known in the art. An embodiment including four channels has been selected for the purposes of illustration only and should not be construed as limiting. The details of beamforming are described with reference to FIG. 12 and specifically sensor A 24, but the concepts of beamforming are readily applicable to other sensors, including sensor B 124. The transmitted signal is collected by antenna 14. Antenna 14 includes spatially diverse antennas 14a, 14b, 14c, and 14d. The transmitted signal detected by antennas 14a, 14b, 14c, and 14d is applied to receiver 15 which includes individual receivers 15a, 15b, 15c, and 15d. Each receiver outputs a narrowband portion of the RF spectrum and constitute the individual receiver output signals. The individual receiver output signals are applied to digitizer 17 which includes A/D converters 17a, 17b, 17c and 17d and which form individual digitized complex signals 21a, 21b, 21c, and 21d consisting of in-phase and quadrature components. These individual digitized complex signals are applied to processor 701 which determines the degree of co-channel and multi-path interference and may forward this signal quality information to the signal quality monitor located in sensor A.

The individual digitized complex signals 21a, 21b, 21c, and 21d, are multiplied by complex weights 703 computed by weight generator 701, and the results are combined in a complex fashion 704 to form a composite digitized signal 21 which has fewer detrimental effects of co-channel or multipath interference when compared to an individual digitized complex signal. The selector 702 is used to select which input is used to drive the beamformer weight estimation. Numerous descriptions exist which describe spatial beamforming techniques to remove the effects of co-channel signals and multi-path signals, an example of which is "Beamforming: A Versatile Approach to Spatial Filtering" by Barry D. Van Veen and Kevin M. Buckley, IEEE ASSP Magazine, April 1988, pages 4–24.

There a several methods to determine the number of received signals present, one such example is the MUSIC (Multiple Signal Classification) algorithm found in "Multiple Emitter Location and Signal Parameter Estimation" by Ralph Schmidt, IEEE Transactions on Antennas and Propagation, Volume AP-34, No. 3, March 1986, pages 276–280. The MUSIC algorithm requires that the signal estimator and beamformer 701 to compute the complex cross correlation matrix (S matrix) between the individual digitized complex signals, 21a, 21b, 21c, and 21d. The eigenvalues and eigenvectors of the cross-correlation matrix (S matrix) are then found. At very low signal-to-noise ratio (SNR) or when no signals are present, all the eigenvalues will be small and similar in amplitude. When one signal is present, the largest eigenvalue corresponds to the signal power, and the remaining eigenvalues may be similar in amplitude and correspond to the noise power of the individual receivers. When N signals are present, there may be N large eigenvalues and the remaining eigenvalues may be the noise power. An analysis of the eigenvalues produces the signal quality estimate which may be sent to the signal quality monitor.

Cross-correlating the Demodulated Output of the Receivers

Another embodiment provides for cross-correlation of the demodulated output of a sensor receiver instead of cross-correlating the pre-detection IF output of a receiver, as described above. The demodulated output has a lower bandwidth and therefore an encoded signal generated therefrom could be transmitted from one sensor to another or to the central processor with a lower data rate than if the pre-detection IF signal were used. In this embodiment, the digitizer, the encoder, and the decoder perform similar functions as described above, however their implementation changes as a result of the form of the respective signals required to be processed. Each sensor and the central processor may include one or more of these functional elements. Referring now to FIG. 13, digitizer 17 accepts the receiver output signal 16 from receiver 15 (not shown) and may convert it to a sequence of samples as directed by timing signal 19. The output of A/D converter 270 may be demodulated by demodulator 272 and then filtered by filter 274. In an analog implementation, demodulator 272 may precede A/D converter 270. Demodulator 272 and filter 274 may be adapted to the type of signal being processed. For example, a digital communication signal from a digital cellular telephone may have a differential QPSK demodulator and a filter bandwidth commensurate with the symbol rate. An FM demodulator may be used for an analog cellular telephone signal and filter 274 may have a 6 kHz bandwidth to pass the SAT.

Encoder 23 accepts digitized signal 21 and may reduce its sample rate using a decimator 276 and may reduce its word width with a quantizer 278 thereby forming encoded signal 25. The encoded signal may be used locally by decoder 27 or transferred to another site such as sensor B or the central processor. Decoder 27 reverses the signal processing of encoder 23 by accepting the encoded signal 25. Decoder 27 may increase the sample rate of the encoded signal using interpolator 279 and remove aliased frequency components by a low pass filter 280 thereby forming reconstructed signal 28. Reconstructed signal 28 may then be applied to a correlator locally or remotely for measuring the time difference of arrival of the transmitted signal at the two sensors.

The present invention has been described in terms of specific embodiments which are illustrative of the invention and not to be construed as limiting. The invention may be implemented in hardware, firmware or software, or in a combination of them. While reference has been made to the existence of a plurality of decoders or correlators in a single sensor, a single hardware or software decoder (or correlator) may be implemented which may be tasked as appropriate to support the operations described herein. The invention has application in both analog and digital cellular telephone location applications. Analog cellular telephone protocols include AMPS, NAMPS, TACS, ETACS, NMT, CTO, CT1, and JCT. Digital applications includes use in performing time difference measurements in RF transmission systems characterized by digital modulation techniques including: global system for mobile communication (GSM) applications, PCS, and other digital modulation techniques including IS-136, IS-54, DCS-1800, JDC, DECT, PHS, and CT2. The invention has application in finding the time difference of arrival of both reverse control channel and reverse voice channel transmissions, wherein the encoders and decoders are tailored to process the various signal formats. Other embodiments are within the scope of the following claims.

What is claimed is:

1. An apparatus for measuring the time difference of arrival between two received signals, each received signal being a time delayed version of a transmitted signal, the transmitted signal being generated by a radio frequency transmitter, the transmitted signal consisting of a continuous transmission on a reverse voice channel of a frequency modulated analog voice signal plus audio tone, the audio tone having a phase that varies with time, the apparatus comprising;

a remote processor including a decoder and a correlator; and a first and second sensor where each sensor includes
a receiver for receiving a received signal, the received signal being a time delayed version of the transmitted signal, the receiver operable to generate a receiver output signal including an audio tone and a voice signal;
an encoder for operating on the receiver output signal to generate an encoded signal where the audio tone of the receiver output signal is modeled as having a specific phase at a specific time; and
means for transferring the encoded signal, to a remote processor;

where the remote processor is operable to receive the encoded signal from one of the first and second sensors and where the decoder is operable to decode the encoded signal resulting in a reconstructed version of the received signal, the correlator operable to correlate the reconstructed version of the received signal with the received signal received by the other of the first and second sensors to derive time difference of arrival data associated with the arrival of the transmitted signal at the first and second sensors.

2. The apparatus of claim 1 wherein each sensor further includes
a decoder that operates on the encoded signal received from another sensor to generate a reconstructed signal representative of the received signal received at the another sensor; and
a correlator for measuring the time difference of arrival between the reconstructed signal representative of the received signal received at the another sensor and the received signal at the sensor.

3. The apparatus of claim 1 where the signal correlated with the reconstructed version of the received signal is a reconstructed version of the received signal received at another sensor.

4. The apparatus of claim 1 wherein the remote processor is co-located with one of the first and second sensors.

5. The apparatus of claim 1 wherein each sensor further includes
- an analog to digital converter for operating on the receiver output signal to generate a digitized signal including a sequence of samples representative of the receiver output signal, each sample consisting of one or more bits and the digitized signal having a bit rate proportional to a number of bits per sample and a number of samples in a given time interval; and
- a sampling controller for controlling sampling of the receiver output signal by the analog to digital converter;
- wherein the encoder operates on the digitized signal to generate the encoded signal which has a bit rate lower than the bit rate of the digitized signal.

6. The apparatus of claim 5 wherein the sampling controller includes time standard; and
- where the remote processor further includes a command-issuing controller operable to issue a tasking command to the time standard indicating a time when the analog to digital converter is to generate a sample of the digitized signal.

7. The apparatus of claim 6 wherein the time standard includes a global positioning system receiver for synchronizing the time standards at each sensor.

8. The apparatus in claim 5 wherein the sampling controller includes a time standard for recording a time when any sample of the digitized signal is generated.

9. The apparatus of claim 1 wherein the encoder includes a signal characteristic monitor for detecting signal characteristics of the received signal; and wherein the remote processor includes a command issuing controller for issuing a tasking command to the signal characteristic monitor indicating a predefined signal characteristic of the received signal, and upon detecting the predefined signal characteristic, the signal characteristic monitor prompting its respective encoder to generate a time stamp associated with an occurance of the predefined signal characteristic for transfer to the remote processor.

10. The apparatus of claim 1 wherein the encoder encodes the receiver output signal by encoding both the audio tone and the voice signal.

11. The apparatus of claim 1 wherein each sensor further includes:
- a decoder for decoding the encoded signal generated at the sensor thereby generating a reconstructed signal; and
- a correlator for measuring an encoding timing error between the reconstructed signal and the receiver output signal, wherein the encoding timing error may be transferred to the remote processor to be combined with the output of the correlator in the remote processor to generate a more accurate determination of the time difference of arrival for the transmitted signal at the first and second sensors.

12. The apparatus of claim 1 wherein the encoders operate on the receiver output signal to measure a phase of the audio tone at a predetermined time.

13. The apparatus of claim 1 wherein the encoders operate on the receiver output signal to measure the time when the audio tone is at a predetermined phase.

14. The apparatus of claim 1 wherein each receiver includes two or more spatially diverse antennas each coupled to two or more downconverters whose outputs are coupled to a beamformer whose single output constitutes the receiver output signal.

15. An apparatus for measuring the time difference of arrival between two received signals, each received signal being a time delayed version of a transmitted signal, the transmitted signal being generated by a radio frequency transmitter, the transmitted signal consisting of a continuous transmission on a reverse voice channel of a frequency modulated analog voice signal plus audio tone, the audio tone having a phase that varies with time, the apparatus comprising:
- a sensor which includes:
  - a receiver which receives a received signal, the received signal being a time delayed version of the transmitted signal, the receiver operable to generate a receiver output signal;
  - an encoder for operating on the receiver output signal to generate an encoded signal where the audio tone of the receiver output signal is modeled as having a specific phase at a specific time;
  - a decoder which decodes an encoded signal transferred from another sensor to generate a reconstructed signal representative of the transmitted signal received at the other sensor; and
  - a correlator for correlating the reconstructed signal and the receiver output signal to determine a time difference of arrival of the receipt of the transmitted signal at the respective sensors.

16. The apparatus of claim 15 wherein the sensor further includes:
- an encoder for operating on the receiver output signal to generate an encoded signal where the audio tone of the receiver output signal is modeled as having a specific phase at a specific time; and
- a network interface for communicating with a network for transmitting the encoded signal to another sensor.

17. The apparatus of claim 16 wherein the sensor further includes:
- an analog to digital converter which operates on the receiver output signal to generate a digitized signal including a sequence of samples representative of the receiver output signal, each sample consisting of one or more bits and the digitized signal having a bit rate proportional to a number of bits per sample and a number of samples in a given time interval; and
- a sampling controller which controls sampling of the receiver output signal by the analog to digital converter,
- where the encoder operates on the digitized signal to generate the encoded signal which has a bit rate lower than the bit rate of the digitized signal.

18. The apparatus of claim 16 wherein the sensor further includes a signal quality monitor for monitoring the signal quality of the received signal, and wherein the apparatus further includes:
- a central processor including a processor controller for receiving signal quality results from the signal quality monitor, for selecting a reference sensor based on the signal quality results and for prompting the reference sensor to transfer its encoded signal to another sensor.

19. The apparatus of claim 18 wherein the signal quality monitor includes:
- a decoder for decoding the encoded signal generated by the encoder to synthesize a local reconstructed signal representative of the receiver output signal; and
- a correlator for determining signal quality as a measure of similarity between the local reconstructed signal and the receiver output signal.

20. The apparatus of claim 18 where the encoder for the sensor only encodes the receiver output signal if the sensor is selected as the reference sensor.

21. The apparatus of claim 18 wherein the sensor passes to another sensor the encoded signal and determines time difference of arrival data, and wherein the central processor further includes an assignment controller for assigning weights to time difference data determinations made at each sensor so that a more accurate determination of a time difference of arrival for the received signals may be made.

22. The apparatus of claim 18 wherein the processor controller selects the reference sensor based on the highest signal-to-noise power ratio as measured by the signal quality monitor.

23. The apparatus of claim 18 wherein the processor controller selects the reference sensor based on the least amount of co-channel interference as measured by the signal quality monitor.

24. The apparatus of claim 18 wherein the processor controller selects the reference sensor based on the least amount of multi-path interference as measured by the signal quality monitor.

25. An apparatus for measuring the time difference of arrival between two received signals, each received signal being a time delayed version of a transmitted signal, the transmitted signal being generated by a radio frequency transmitter and consisting of a continuous transmission on a reverse voice channel of a frequency modulated analog voice signal plus audio tone, the apparatus comprising:

first and second sensors where each sensor includes
a receiver for receiving a received signal, the received signal being a time delayed version of the transmitted signal, the receiver operable to generate a receiver output signal including an audio tone and a voice signal;
an analog to digital converter for operating on the receiver output signal to generate a digitized signal including a sequence of samples representative of the receiver output signal, each sample consisting of one or more bits and the digitized signal having a bit rate proportional to a number of bits per sample and a number of samples in a given time interval;
an encoder for operating on the digitized signal to generate an encoded signal which has a bit rate lower than the bit rate of the digitized signal; and
a central processor that includes
a decoder that operates on encoded signals received from each sensor to generate reconstructed signals representative of the received signals; and
a correlator for measuring the time difference of arrival between the reconstructed signals.

26. The apparatus of claim 25 wherein the transmitted signal consists of a digital communication signal consisting of a sequence of symbols, and where the receiver output signal is encoded according to an occurrence of a symbol of the receiver output signal at a specific time.

27. The apparatus of claim 26 wherein the encoder models the receiver output signal according to recovered symbols, carrier phase and frequency.

28. The apparatus of claim 25 wherein each sensor further includes:
a sampling controller for controlling sampling of the receiver output signal by the analog to digital converter; and
where the encoder operates on the digitized signal to generate the encoded signal which has a bit rate lower than the bit rate of the digitized signal.

29. The apparatus of claim 28 wherein the sampling controller includes:
a time standard; and
wherein the central processor further includes:
a command-issuing controller for issuing a tasking command to each time standard indicating a time when the analog to digital converter is to generate a sample of the digitized signal.

30. The apparatus of claim 29 wherein the time standard includes a global positioning system receiver for synchronizing the time standards at each sensor.

31. The apparatus of claim 28 wherein the sampling controller includes a time standard for recording a time when any sample of the digitized signal is generated.

32. The apparatus of claim 25 wherein the encoder includes a signal characteristic monitor for detecting signal characteristics of a received signal and the central processor includes a command issuing controller for issuing a tasking command to the signal characteristic monitor of each encoder indicating a predefined signal characteristic of the received signal, and upon detecting the predefined signal characteristic, the signal characteristic monitor prompting its respective encoder to generate a time stamp associated with an occurrence of the predefined signal characteristic for transfer to the remote processor.

33. The apparatus of claim 25 wherein each receiver includes two or more spatially diverse antennas each coupled to two or more downconverters whose outputs are coupled to a beamformer whose single output constitutes the receiver output signal.

34. An apparatus for measuring the time difference of arrival between two received signals, each received signal being a time delayed version of a transmitted signal, the transmitted signal being generated by a radio frequency transmitter and consisting of a continuous transmission on a reverse voice channel of a frequency modulated analog voice signal plus audio tone, the apparatus comprising:

two sensors each including
a receiver for receiving a received signal including an audio tone and a voice signal, the received signal having a first bit rate associated therewith and being a time delayed version of the transmitted signal;
an encoder for operating on the received signal to generate an encoded signal having a second bit rate, where the first bit rate is greater than the second bit rate;
a signal quality monitor for monitoring the signal quality of the received signal;
means for transferring the encoded signal to another sensor;
a decoder for decoding an encoded signal received from another sensor to generate a reconstructed signal representative of the received signal at the other sensor; and
a correlator for correlating the reconstructed signal and the received signal for a given sensor to determine a time difference of arrival for receiving the received signals at the respective sensors; and
a central processor including a controller for receiving signal quality results from the signal quality monitor in each sensor, for selecting a reference sensor based on the signal quality results and for prompting the reference sensor to transfer an encoded signal to another sensor.

35. A method for reducing network bandwidth in a cellular communication system having a plurality of remote cells each including a sensor for determining time difference of arrival measurements between two received signals, each received signal being a time delayed version of a transmitted signal as intercepted at two remote sensors in a cellular communication system, the transmitted signal being generated by a cellular telephone and consisting of a continuous transmission on a reverse voice channel of a frequency modulated analog voice signal plus audio tone, the method comprising:

receiving a received signal from a cellular telephone at two remote sensors;

generating an arrival signal at each remote sensor including arrival information associated with the received signals including an audio tone and a voice signal, wherein the arrival signal has a first bit rate associated therewith;

modeling the arrival signal based on one or more signal characteristics to produce an encoded arrival signal, the encoded arrival signal having a second bit rate, where the first bit rate is greater than the second bit rate;

transmitting the encoded arrival signal to the central processing facility;

decoding encoded arrival signals from the two remote sensors to reconstruct the arrival signals;

correlating the reconstructed arrival signals to determine time difference of arrival data.

36. The method of claim 35 further including determining a reference arrival signal from the encoded arrival signals and correlating an arrival signal associated with the remote sensor that did not produce the reference arrival signal and the reference arrival signal to compute time difference of arrival data.

37. The method of claim 36 wherein the reference arrival signal is selected based on quality data gathered at the remote sensor.

38. The method of claim 37 wherein the quality data is selected from the group of signal-to-noise power ratio, co-channel interference, multi-path interference, and a correlation coefficient derived from a correlation of the arrival signal and a reconstructed arrival signal.

39. The method of claim 36 wherein the reference arrival signal is distributed to the other remote sensor for correlation with an arrival signal.

40. The method of claim 39 wherein each remote sensor calculates time difference of arrival data based on the reference arrival signal and the received signal.

41. The method of claim 40 wherein each calculated time measurement is weighted based on signal quality to more accurately determine the time difference of arrival for the received signals.

42. The method of claim 35 wherein the transmitted signal consists of a frequency modulated voice signal plus audio tone and the arrival signal is modeled based on the voice signal and the phase, frequency and amplitude of the audio tone.

43. The method of claim 35 wherein the received signal is a digital communication signal received from a digital cellular telephone and where the received signal is encoded based on a measured symbol epoch for the received signal.

44. The method of claim 35 wherein the correlating step is accomplished remotely at one of the remote sensors and wherein the process further includes selecting a reference encoded signal from the encoded signals and transmitting the reference encoded signal to each remote sensor prior to correlating.

45. A method for reducing network bandwidth while determining time difference of arrival measurements between two received signals, each received signal being a time delayed version of a transmitted signal as intercepted at two remote sensors in a cellular communication system, the transmitted signal being generated by a cellular transmitter and consisting of a continuous transmission on a reverse voice channel of a frequency modulated analog voice signal plus audio tone, the method comprising:

receiving a received signal from a cellular telephone at two remote sensors;

generating an arrival signal at each remote sensor including arrival information associated with the received signal;

encoding the arrival signal;

transmitting the encoded arrival signal to a central processing facility;

selecting the encoded arrival signal from one of the two remote sensors as a reference signal;

distributing the reference signal to all of the remote sensors;

at each remote sensor decoding the reference signal;

correlating an arrival signal from one of the remote sensors with the reference signal to determine time difference of arrival data; and transmitting the time difference of arrival data to the central processing facility.

46. A method for reducing network bandwidth while determining time difference of arrival measurements between two received signals, each received signal being a time delayed version of a transmitted signal as intercepted at two remote sensors in a cellular communication system, the transmitted signal being generated by a cellular telephone and consisting of a continuous transmission on a reverse voice channel of a frequency modulated analog voice signal plus audio tone, the method comprising:

receiving a received signal from the cellular telephone at two remote sensors;

selecting one of the remote sensors as a reference remote sensor based on a predetermined signal characteristic of the received signal;

generating a reference signal at the reference remote sensor including arrival information associated with the received signal at the reference remote sensor;

transmitting the reference signal to the other remote sensor;

decoding the reference signal at the other remote sensor to reconstruct the received signal received at the reference remote sensor;

correlating the received signal at the other remote sensor and the reconstructed received signal to determine time difference of arrival data.

47. An apparatus for measuring the time difference of arrival between two received signals, each received signal being a time delayed version of a transmitted signal, the transmitted signal being generated by a radio frequency transmitter and consisting of a continuous transmission on a reverse voice channel of a frequency modulated analog voice signal plus audio tone, the apparatus comprising:

a first and second sensor where each sensor includes a receiver for receiving a received signal and generating an receiver output signal, a demodulator for demodulating the receiver output signal and generating a demodulator output signal including an audio tone and a voice signal, a filter for limiting the bandwidth of the demodulator output signal and generating a filter output signal, an analog to digital converter operating on the filter output signal for generating a digitized signal consisting of a sequence of samples, a time standard to control when the analog to digital converter generates samples, and network interface for communicating with a network to transmit a representation of the digitized signal to a remote processor, where the representation of the digitized signal is modeled as having a specific phase at a specific time; and the remote processor including a correlator which operates on the two digitized signals to measure the time difference of arrival between the two received signals.

* * * * *